(12) United States Patent
Johnson et al.

(10) Patent No.: US 8,335,593 B2
(45) Date of Patent: Dec. 18, 2012

(54) POWER-USING DEVICE MONITOR

(75) Inventors: Derek Mallough Johnson, Matthews, NC (US); Nickolas Gerhard Friedrich, Charlotte, NC (US); Russell Dean Warner, Indian Trail, NC (US)

(73) Assignee: Bank of America Corporation, Charlotte, NC (US)

( * ) Notice: Subject to any disclaimer, the term of this patent is extended or adjusted under 35 U.S.C. 154(b) by 325 days.

(21) Appl. No.: 12/617,220

(22) Filed: Nov. 12, 2009

(65) Prior Publication Data
US 2011/0112701 A1    May 12, 2011

(51) Int. Cl.
G05D 11/02 (2006.01)
G05D 3/12 (2006.01)

(52) U.S. Cl. ........................ 700/285; 700/295
(58) Field of Classification Search .................. 700/285, 700/295
See application file for complete search history.

(56) References Cited

U.S. PATENT DOCUMENTS

| | | | | |
|---|---|---|---|---|
| 4,215,408 | A * | 7/1980 | Games et al. | 700/278 |
| 2004/0002792 | A1 * | 1/2004 | Hoffknecht | 700/295 |
| 2004/0260490 | A1 * | 12/2004 | Matsubayashi et al. | 702/60 |
| 2009/0281677 | A1 * | 11/2009 | Botich et al. | 700/295 |

OTHER PUBLICATIONS

U.S. Appl. No. 12/617,217, filed Nov. 12, 2009, Johnson et al.
U.S. Appl. No. 12/617,224, filed Nov. 12, 2009, Johnson et al.
U.S. Appl. No. 12/617,228, filed Nov. 12, 2009, Johnson et al.
U.S. Appl. No. 12/621,265, filed, Nov. 18, 2009, Johnson et al.

* cited by examiner

Primary Examiner — Mohammad Ali
Assistant Examiner — Sivalingam Sivanesan
(74) Attorney, Agent, or Firm — Michael A. Springs; Moore & Van Allen, PLLC; Padowithz Alce

(57) ABSTRACT

Embodiments of the present invention provide apparatuses and methods for intelligently monitoring and managing, from a centralized location, one or more power-using systems. For example, in one embodiment of the invention, a current sensor is installed at each heating or cooling system at a facility to measure the electricity used by each heating or cooling system. A current sensor is also installed at each facility to measure the total amount of electricity used by the facility. The current measurements are monitored in real time or near real time to monitor operation of the heating and cooling systems at the facility. In some embodiments, temperature sensors and other sensors are installed for each heating and cooling system and are also used to monitor operation of the heating and cooling systems. In some embodiments, controllers are also installed for each heating and cooling system to permit control of each system at a remote central control system.

21 Claims, 40 Drawing Sheets

HVAC MONITORING AND CONTROL SYSTEM 600

- CONTROLLER 610
- RAIDO MODEM 620 OR COMMUNICATION BUS 630
- WHOLE UNIT CURRENT SENSOR 640 OR BLOWER UNIT CURRENT SENSOR 650 AND CONDENSER UNIT CURRENT SENSOR 655
- DISCHARGE TEMP. SENSOR 660
- AC STEPDOWN TRANSFORMER 670
- DC POWER SUPPLY 680

The unit survey is complete. Tap 'Done' to save and exit.

<-Prev  Quit  100%  Done!

FIG. 21R

POWER-USING DEVICE MONITOR

FIELD

Embodiments of the invention relate generally to the field of energy and/or facility management systems, and, more particularly, embodiments of the invention relate to apparatuses and methods for intelligently monitoring and managing, from a centralized location, one or more power-using systems.

BACKGROUND

Large organizations having multiple facilities around the world can use a lot of energy, including but not limited to electricity for electrical outlets, lighting, heating, and/or cooling. With energy costs on the rise, pressure to improve the bottom line in financial statements, and the desire to reduce energy consumption for environmental reasons, organizations must find ways to cut energy usage. There is the potential for large savings if a large organization can reduce, even slightly, the amount of energy it uses for electricity through electrical outlets, lighting, heating, and/or cooling in the organization's offices, stores, warehouses, and other facilities. This may be especially true in the case of organizations that have thousands, if not tens of thousands, of facilities spread out across the world in different climates. As such, there is a need to develop apparatuses and methods to efficiently monitor and manage energy-using systems across a plurality of remote facilities and to manage those utilities in a way that tries to minimize the amount of energy used at the various facilities, while still providing suitable environments for the organization's employees and customers.

BRIEF SUMMARY

Embodiments of the present invention provide apparatuses and methods for intelligently monitoring and managing, from a centralized location, one or more power-using systems. For example, in one embodiment of the invention, a current sensor is installed at each heating or cooling system at a facility to measure the electricity used by each heating or cooling system. A current sensor is also installed at each facility to measure the total amount of electricity used by the facility. The current measurements are monitored in real time or near real time to monitor operation of the heating and cooling systems at the facility. In some embodiments, temperature sensors and other sensors are installed for each heating and cooling system and are also used to monitor operation of the heating and cooling systems. In some embodiments, controllers are also installed for each heating and cooling system to permit control of each system at a remote central control system.

More particularly, embodiments of the invention include a method of remotely managing a plurality of energy-using devices. In one embodiment, the method involves: (1) installing a device energy sensor at each of the plurality of energy-using devices, the device energy sensor configured to measure an electrical characteristic indicative of energy being used by the energy-using device, wherein each device energy sensor includes a communication interface configured to communicate an energy-indicative measurement over a network; (2) receiving at a remote computer, via the network, the energy-indicative measurement from the device energy sensor at each of the plurality of energy-using devices; and (3) using the energy-indicative measurement to monitor each of the plurality of energy-using devices. In some embodiments, the method further involves: (4) installing a controller at each of the plurality of energy-using devices, the controller including a communication interface configured to receive commands over the network and adjust operation of the energy-using devices based on the commands; and (5) using the remote computer to issue commands, via the network, to the controller at each of the plurality of energy-using devices in order to control operation of the plurality of energy-using devices.

In some embodiments of the method, the plurality of energy-using devices includes HVAC (heating, ventilating, or air conditioning) devices. In some embodiments of the method, the electrical characteristic indicative of the energy being used by the energy-using device includes electrical current. In some embodiments of the method, the plurality of energy-using devices includes one or more lighting zones.

In some embodiments, the method further involves using the remote computer to issue an alarm automatically whenever the received energy-indicative measurements satisfy one or more alarm conditions stored in a memory device operatively coupled to the remote computer. In some embodiments, the method further involves: installing a facility energy sensor at each of a plurality of facilities, the facility energy sensor configured to measure an electrical characteristic indicative of energy being used by one of the plurality of facilities, wherein each facility energy sensor includes a communication interface configured to communicate an energy-indicative measurement over the network; and using the remote computer to receive the energy-indicative measurements from the facility energy sensor located at each of a plurality of facilities, and to compare the energy-indicative measurements received from the device energy sensors located at a particular facility with the facility energy sensor located at the particular facility.

Embodiments of the invention also include a heating or cooling system having: (1) a plurality of current sensors, each of the plurality of current sensors measuring electrical current drawn by one of a plurality of heating or cooling devices, wherein each of the plurality of current sensors includes a communication interface for communicating measurements over a network; and (2) a control panel having a communication interface and configured to use the communication interface to gather, via the network, the measurements from each of the plurality of current sensors. In some embodiments, the system further includes a plurality of controllers, each of the plurality of controllers configured to control at least a portion of one of the plurality of heating or cooling devices.

In some embodiments of the invention, the system further includes: a plurality of control panels; a plurality of facilities, each of the plurality of facilities comprising one or more of the plurality of heating or cooling devices and one of the plurality of control panels; and a command and control center located remote from the plurality of facilities and configured to receive, from the plurality of control panels, the measurements from each of the plurality of current sensors. In some embodiments of the system, the network includes a local area network and the control panel further includes a second communication interface configured to communicate, via a second network (e.g., the Internet), with a command and control center located remote from the plurality of facilities, and wherein the second network comprises a wide area network.

In some embodiments, the heating or cooling system further includes a facility energy sensor configured to measure an electrical characteristic indicative of energy being used by a facility at which at least one of the plurality of heating or cooling devices is located, wherein each facility energy sensor includes a communication interface configured to communicate an energy-indicative measurement over the network. In some such embodiments, the system further includes a computer configured to receive the energy-indicative measurements from the facility energy sensor, and to compare the energy-indicative measurements received from the facility energy sensor to energy-indicative measurements received from the current sensors associated with the heating or cooling devices located at the facility at which the facility energy sensor is located.

In some embodiments, the heating or cooling system further includes a plurality of temperature sensors, each of the plurality of temperature sensors measuring temperature of a space heated or cooled by one of the plurality of heating or cooling devices, where each of the plurality of temperature sensors comprises a communication interface for communicating temperature measurements over a network, and where the control panel is configured to use the communication interface to gather, via the network, the temperature measurements from each of the plurality of temperature sensors. In some such embodiments, the system further includes a plurality of controllers, each of the plurality of controllers configured to control one of the plurality of heating or cooling devices, wherein each of the plurality of controllers comprises a communication interface for communicating with the control panel over the network, wherein the system is configured to generate a command based on a temperature measurement from at least one of the plurality of temperature sensors, wherein the control panel is configured to communicate the command to at least one of the plurality of controllers, and wherein the at least one of the plurality of controllers is configured to control the heating or cooling system based on the command.

In some embodiments, the heating or cooling system further includes a plurality of temperature sensors, each of the plurality of temperature sensors measuring temperature of a fluid entering one of the plurality of heating or cooling devices, wherein each of the plurality of temperature sensors comprises a communication interface for communicating temperature measurements over a network, and wherein the control panel is configured to use the communication interface to gather, via the network, the temperature measurements from each of the plurality of temperature sensors.

In some embodiments, the heating or cooling system further includes a plurality of humidity sensors, each of the plurality of humidity sensors measuring humidity of a space heated or cooled by one of the plurality of heating or cooling devices, wherein each of the plurality of humidity sensors comprises a communication interface for communicating humidity measurements over a network, and wherein the control panel is configured to use the communication interface to gather, via the network, the humidity measurements from each of the plurality of humidity sensors. In some such embodiments, the system further includes a plurality of controllers, each of the plurality of controllers configured to control one of the plurality of heating or cooling devices, wherein each of the plurality of controllers comprises a communication interface for communicating with the control panel over the network, wherein the system is configured to generate a command based on a humidity measurement from at least one of the plurality of humidity sensors, wherein the control panel is configured to communicate the command to at least one of the plurality of controllers, and wherein the at least one of the plurality of controllers is configured to control the heating or cooling system based on the command.

In some embodiments, the heating or cooling system further includes a plurality of carbon dioxide sensors, each of the plurality of carbon dioxide sensors measuring carbon dioxide in a space heated or cooled by one of the plurality of heating or cooling devices, wherein each of the plurality of carbon dioxide sensors comprises a communication interface for communicating carbon dioxide measurements over a network, and wherein the control panel is configured to use the communication interface to gather, via the network, the carbon dioxide measurements from each of the plurality of carbon dioxide sensors. In some such embodiments, the system further includes a plurality of controllers, each of the plurality of controllers configured to control one of a plurality of ventilating devices, wherein each of the plurality of controllers comprises a communication interface for communicating with the control panel over the network, wherein the system is configured to generate a command based on a carbon dioxide measurement from at least one of the plurality of carbon dioxide sensors, wherein the control panel is configured to communicate the command to at least one of the plurality of controllers, and wherein the at least one of the plurality of controllers is configured to control the one of the plurality of ventilating devices based on the command.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
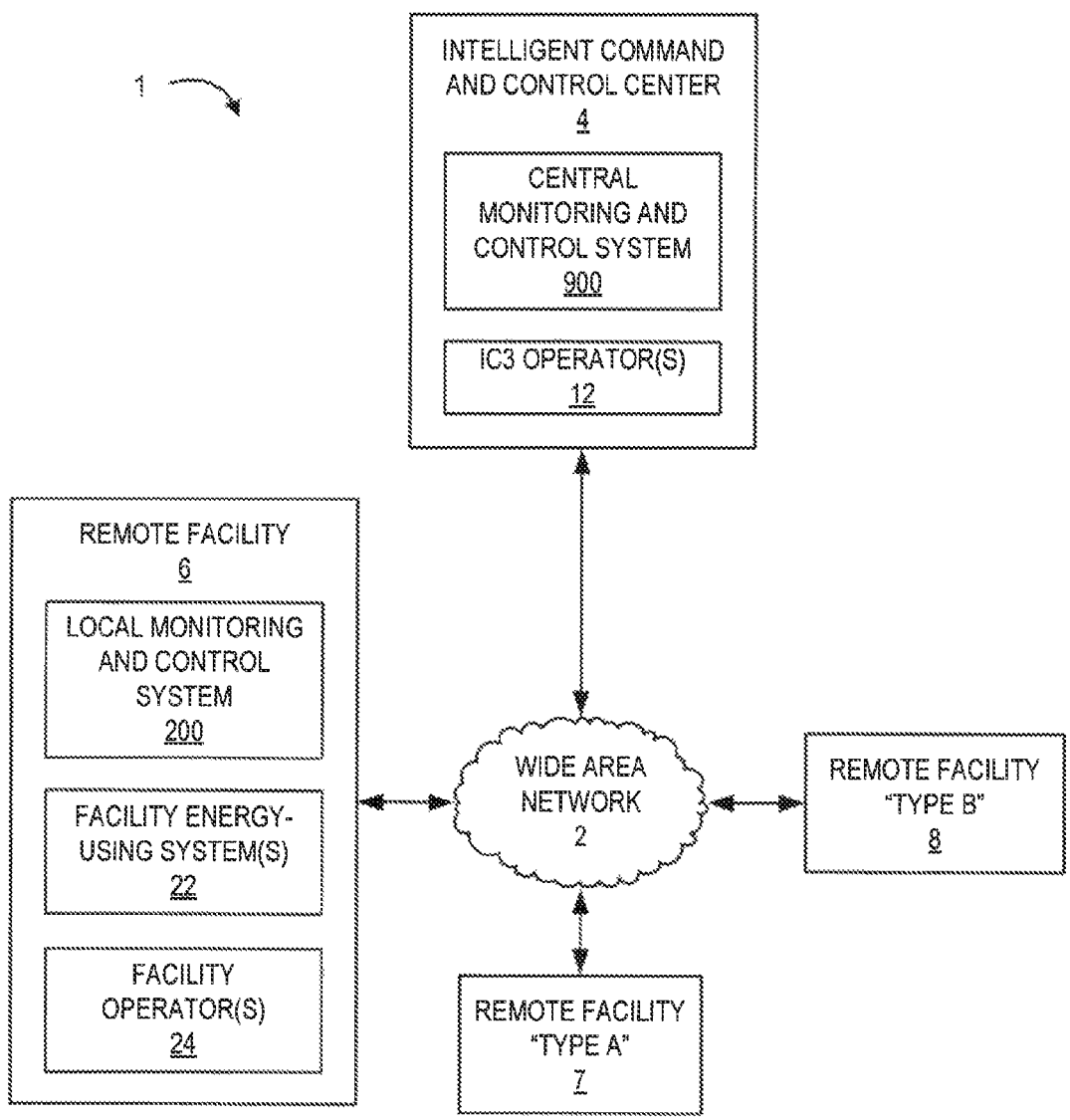
Figure 2:
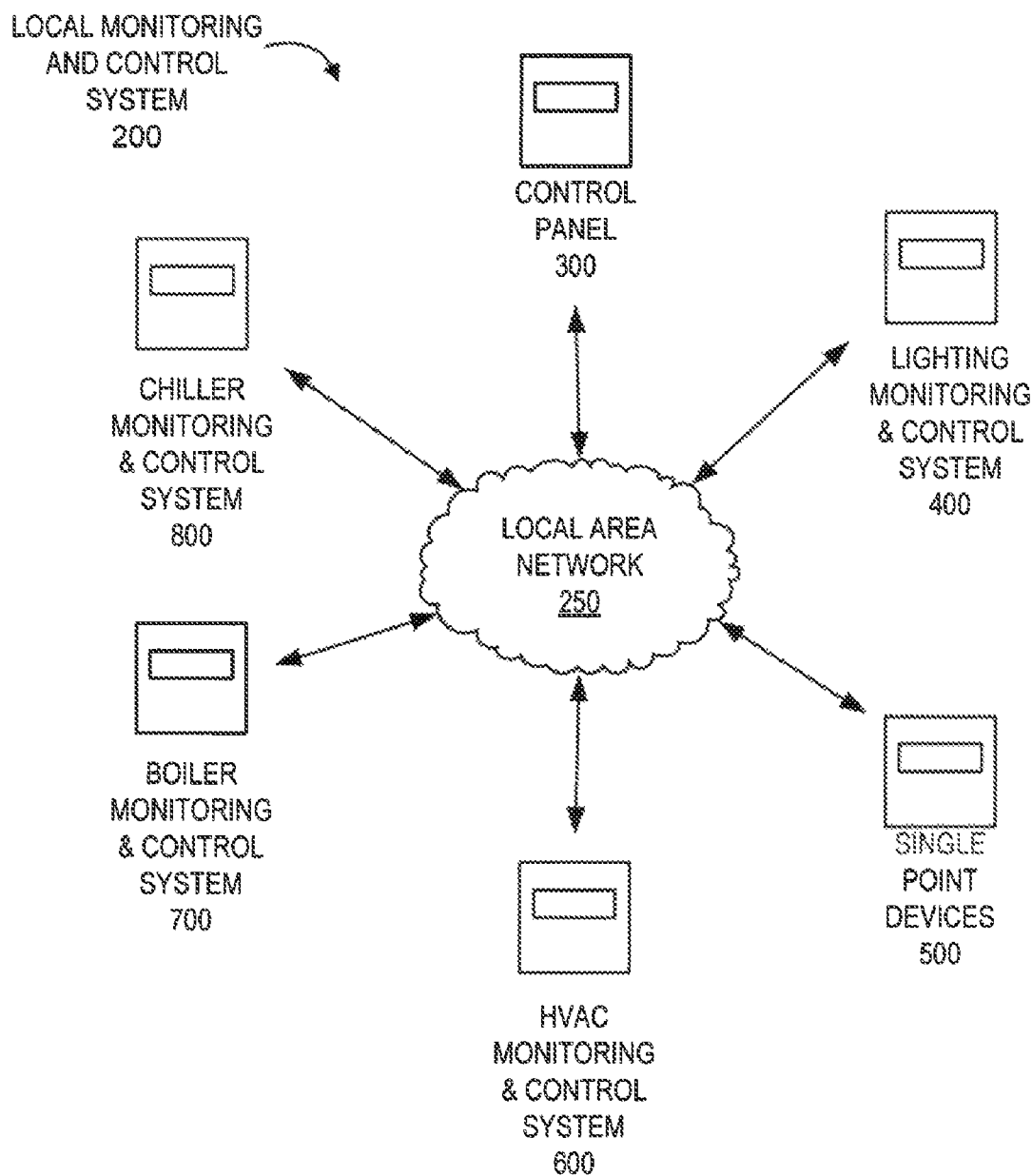
Figure 3:
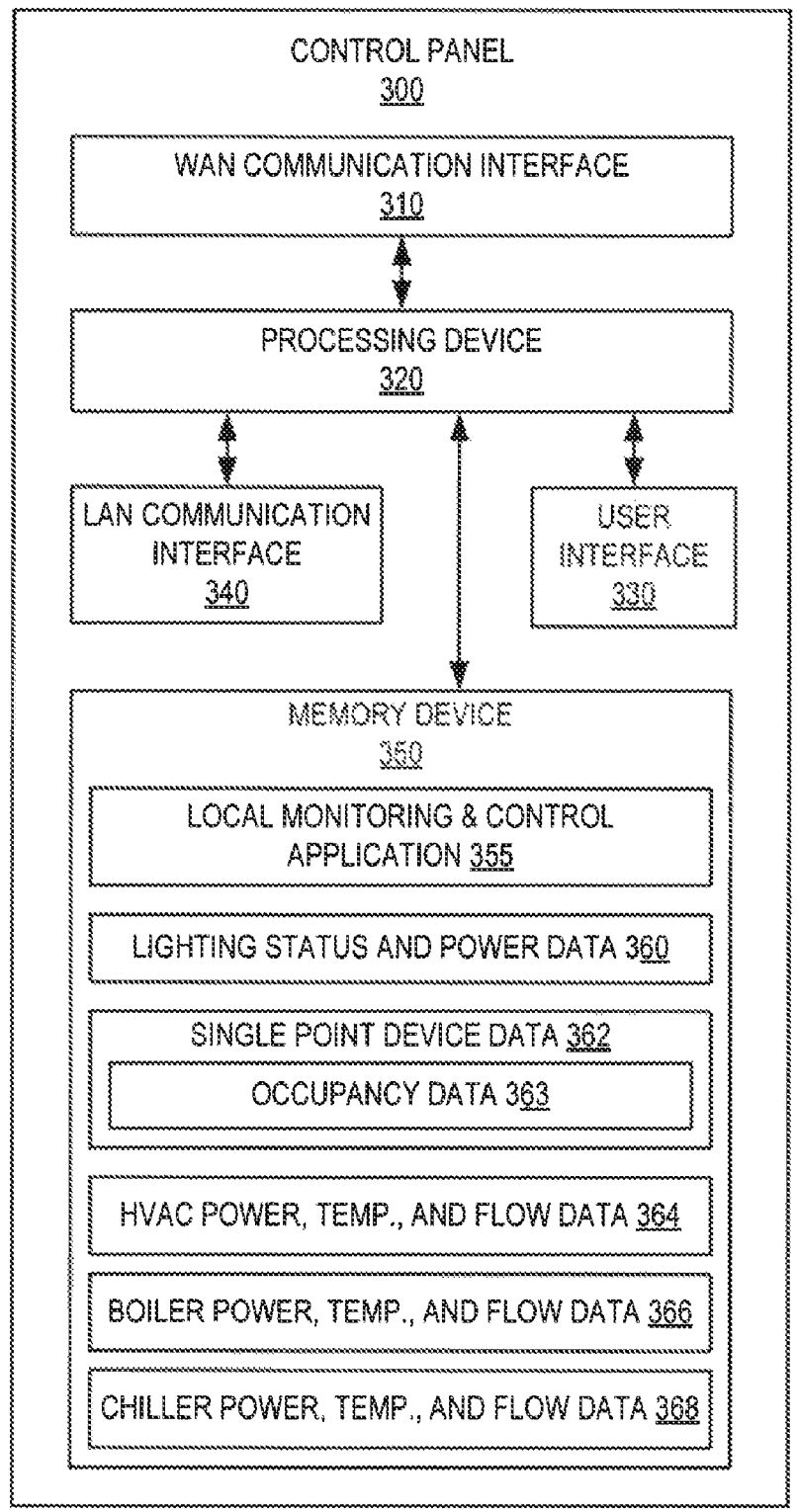
Figure 4:
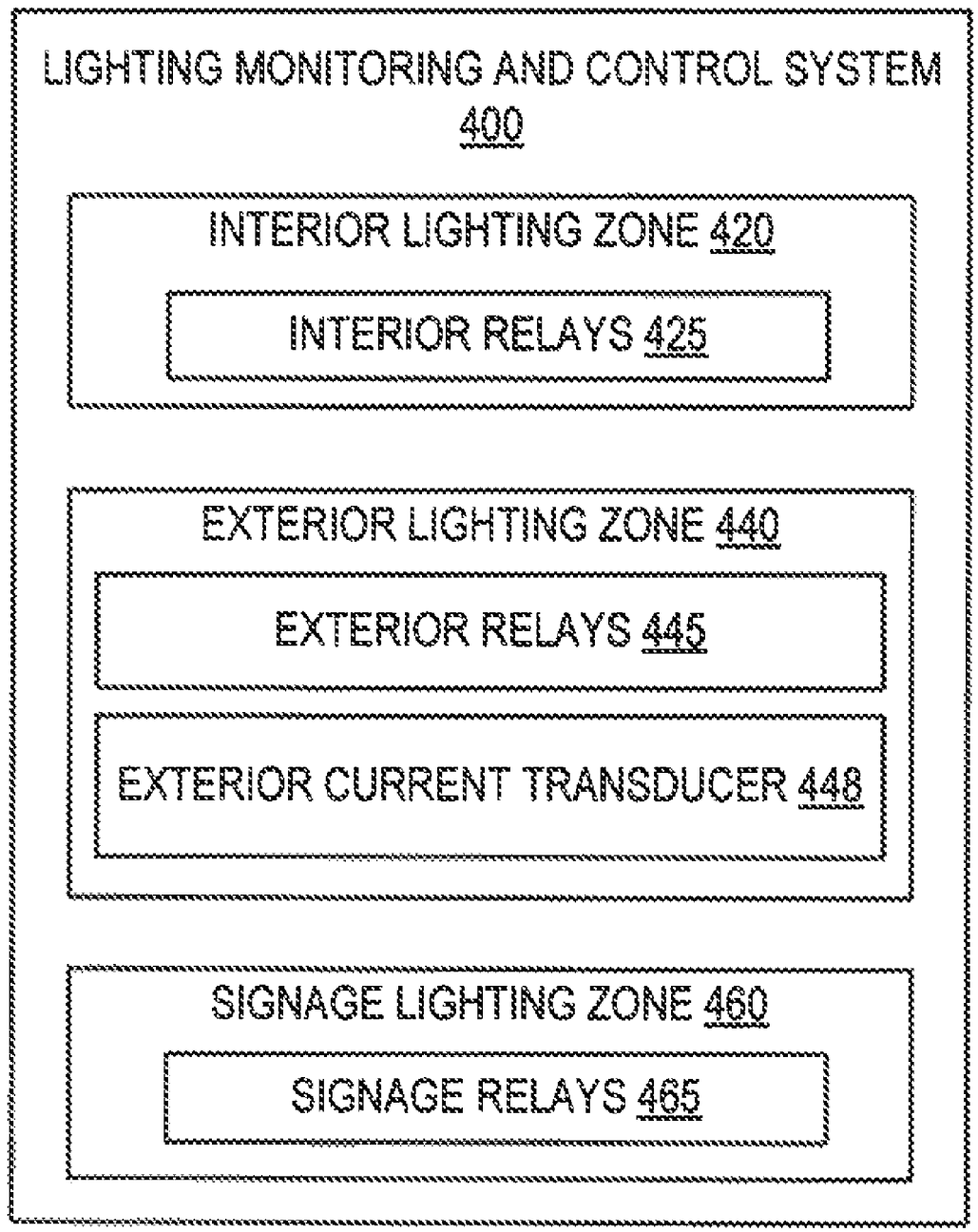
Figure 5:
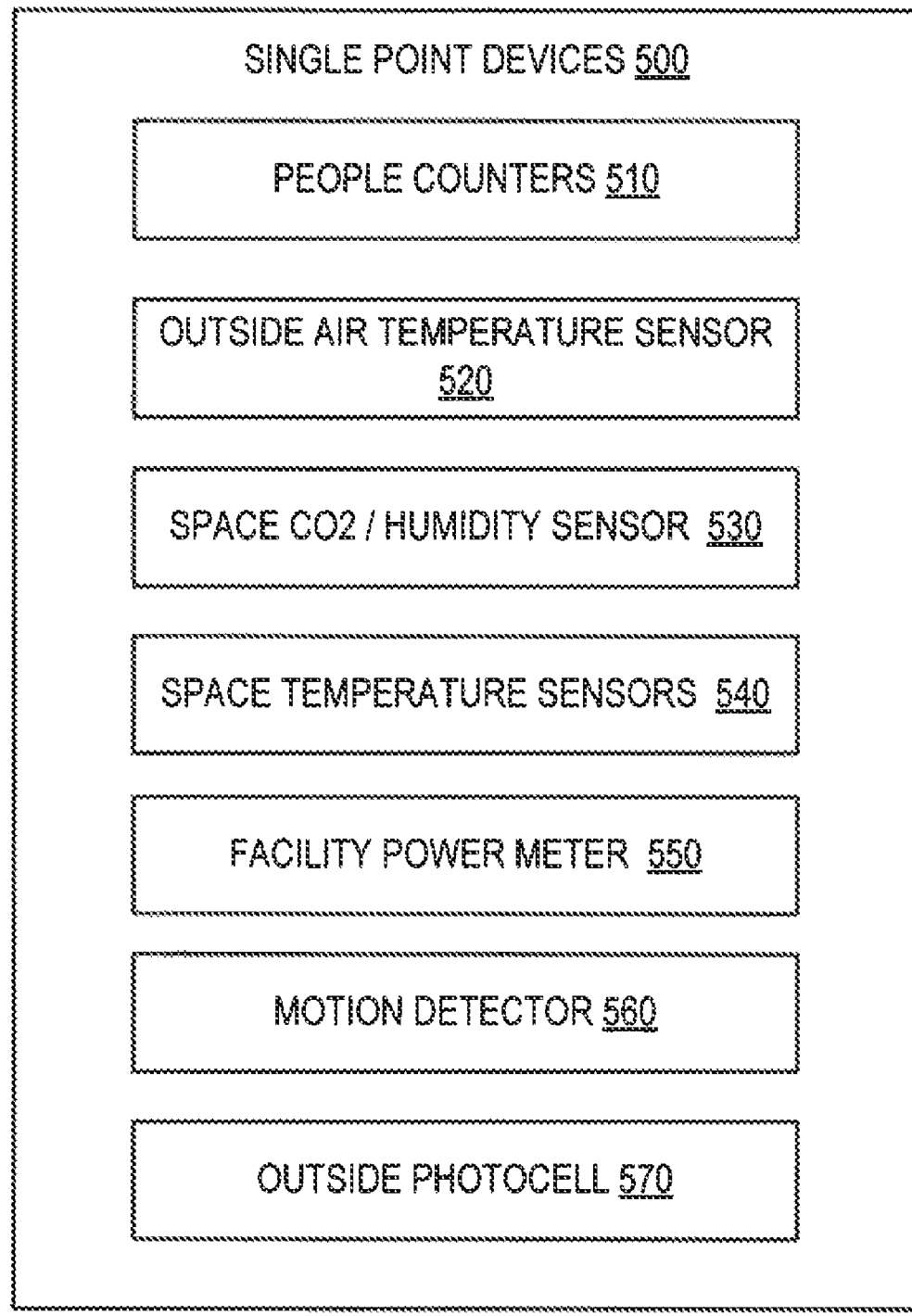
Figure 7:
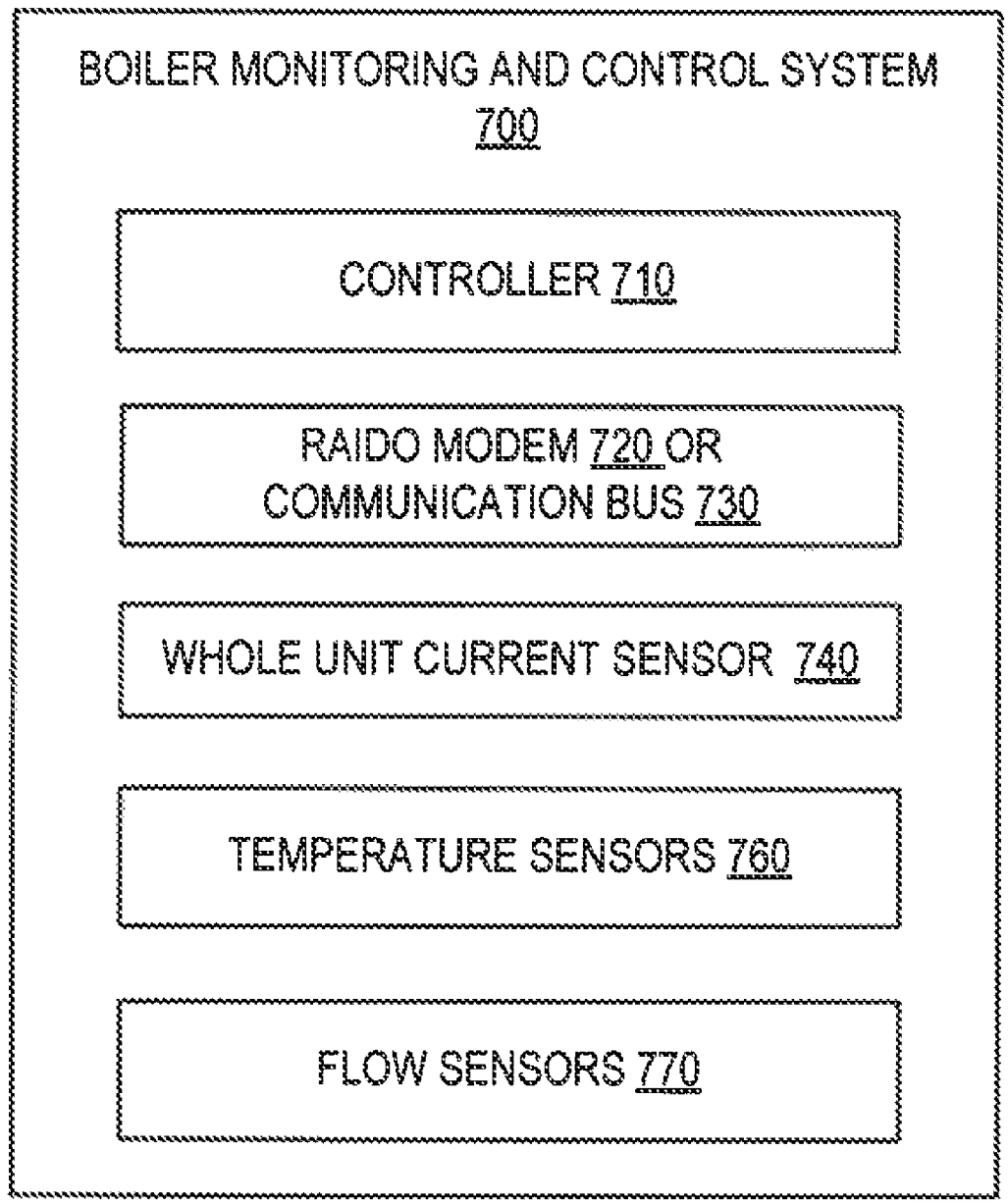
Figure 8:
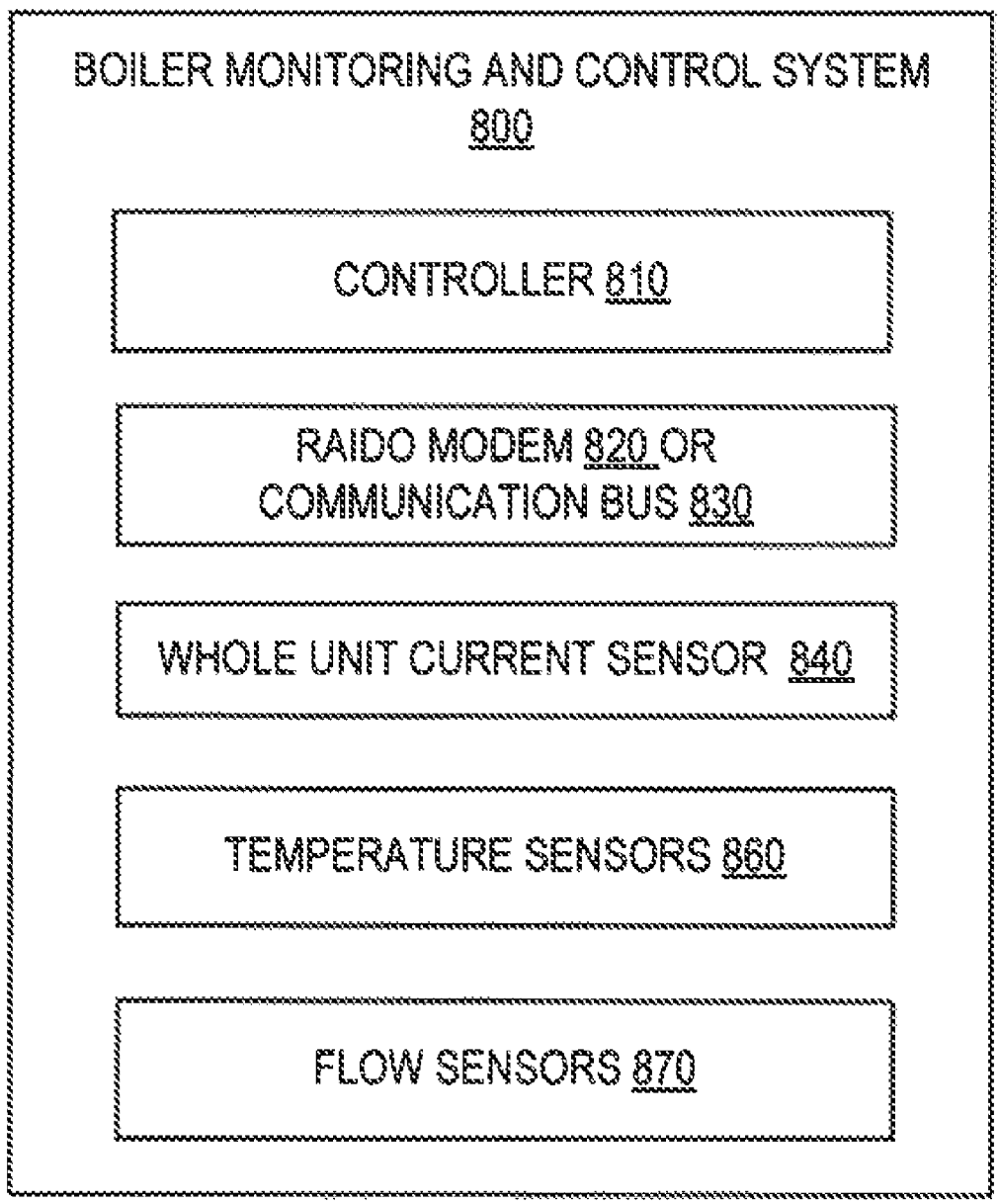
Figure 9:
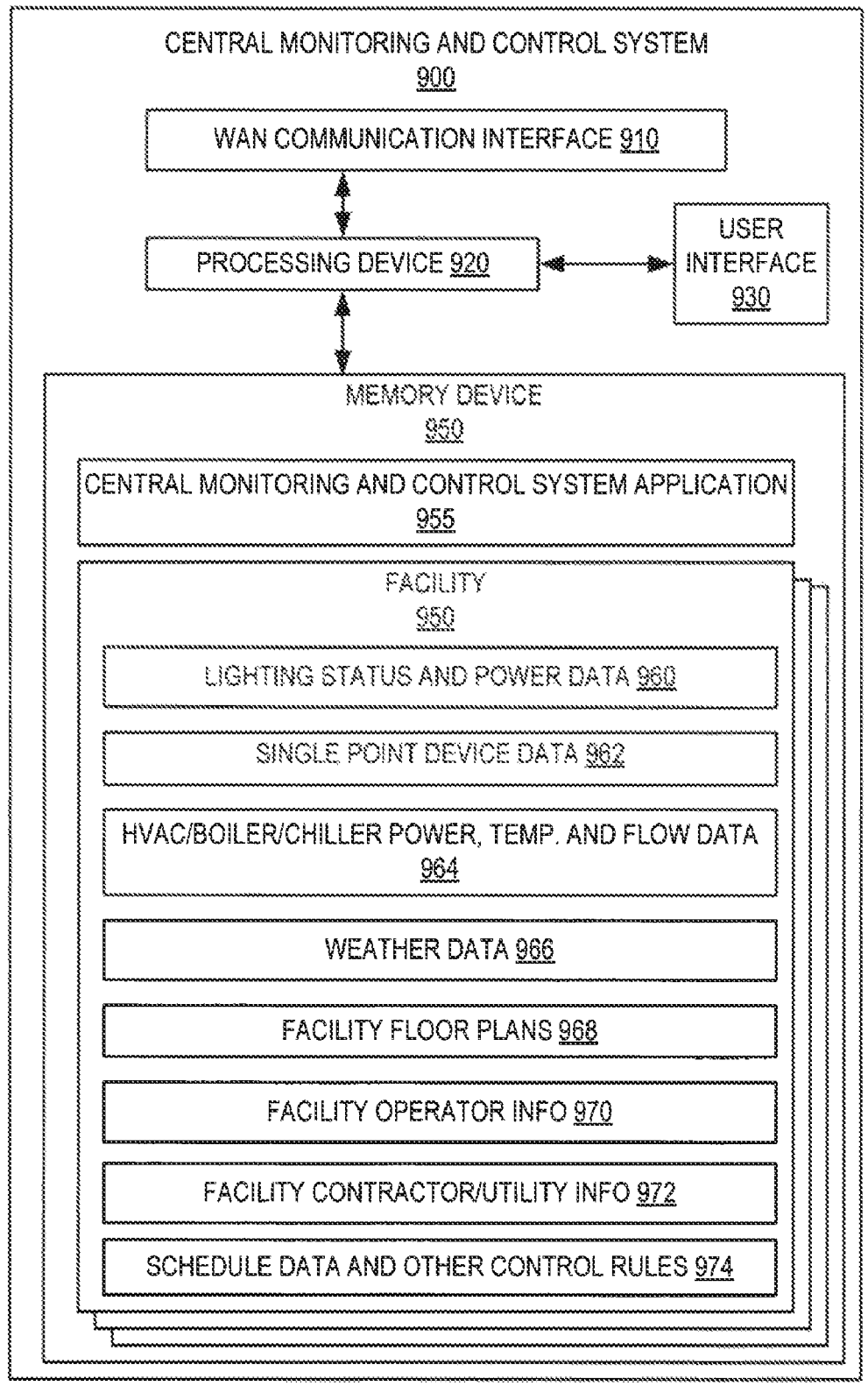
Figure 10A:
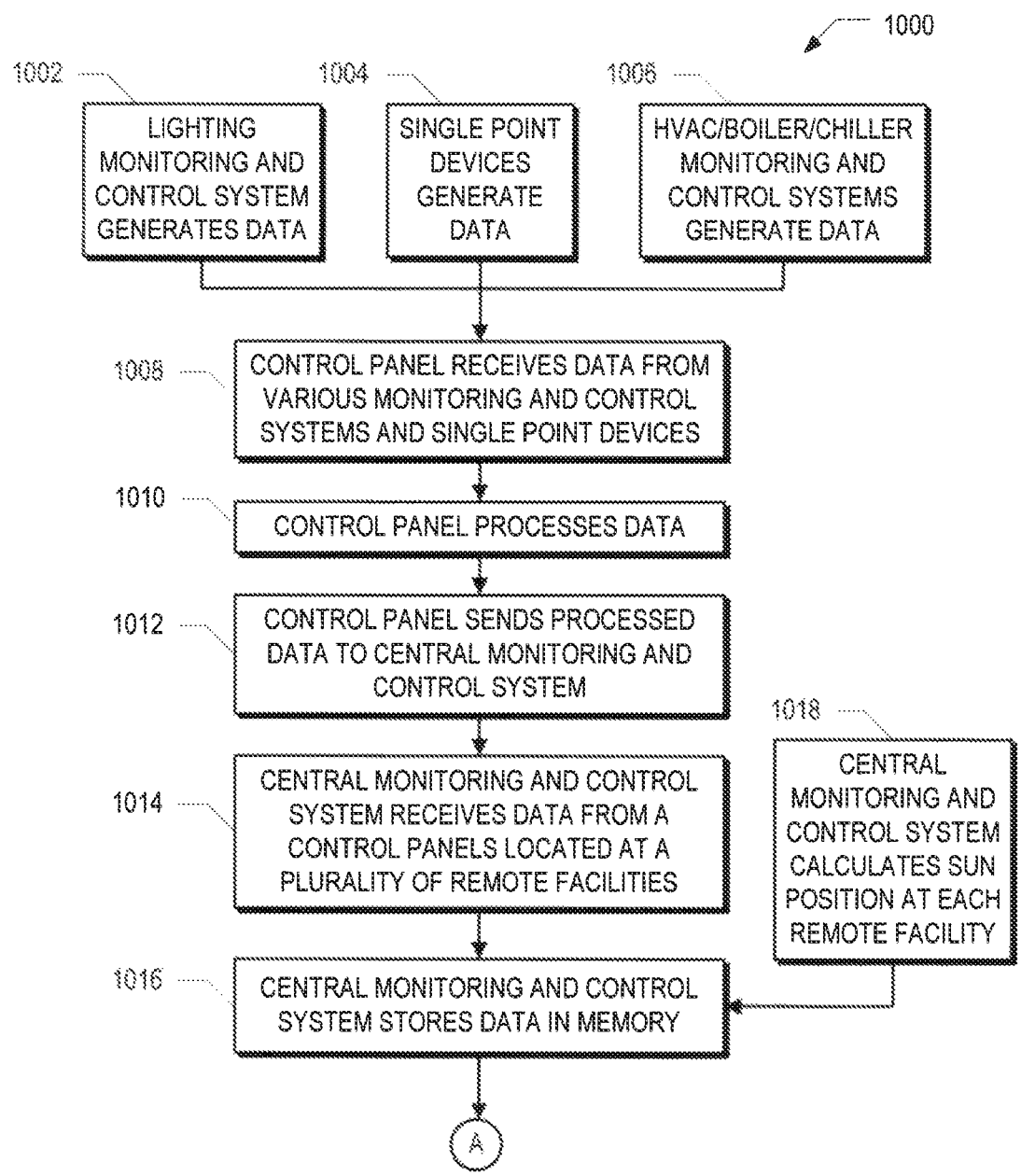
Figure 10B:
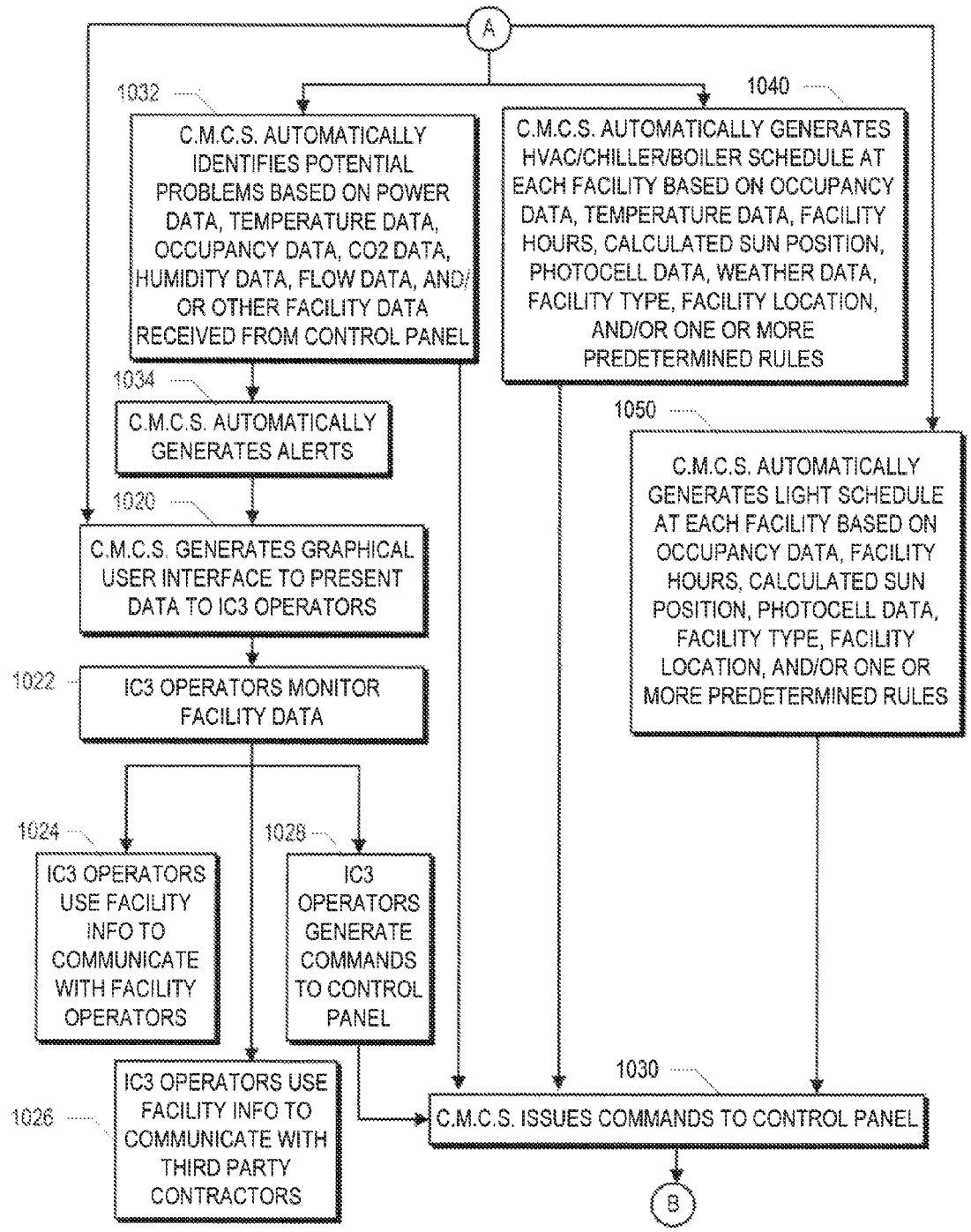
Figure 10C:
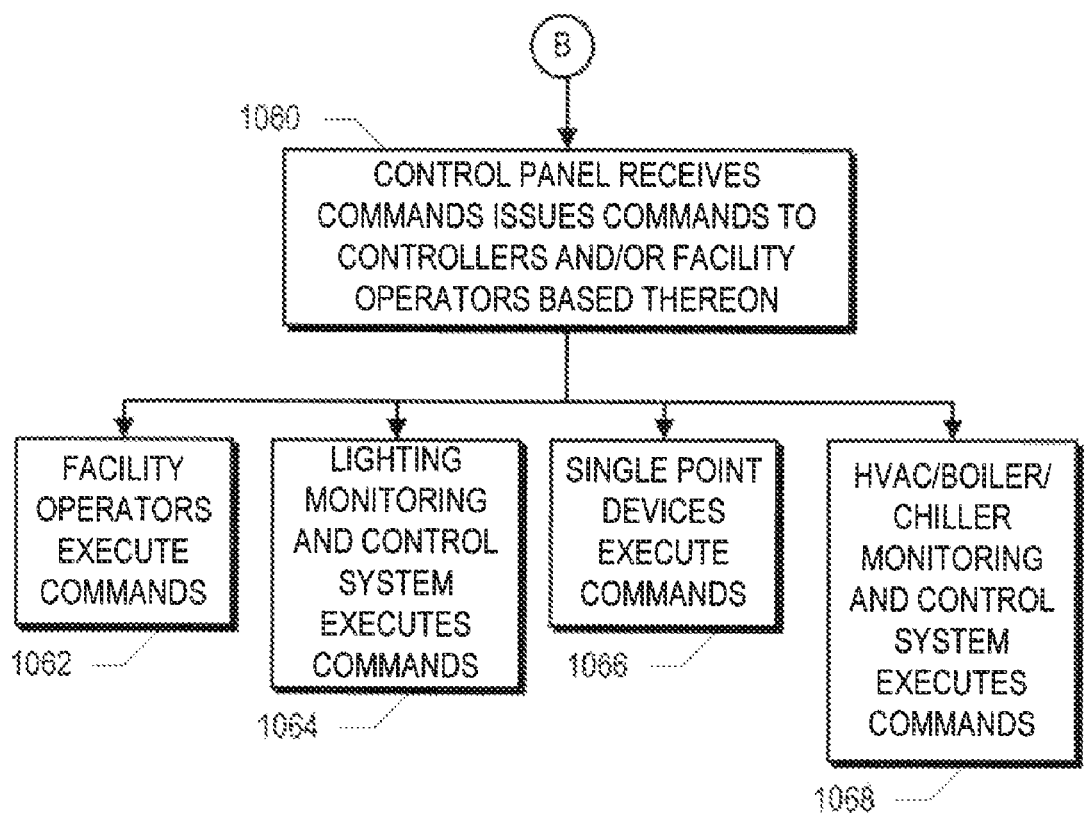
Figure 11:
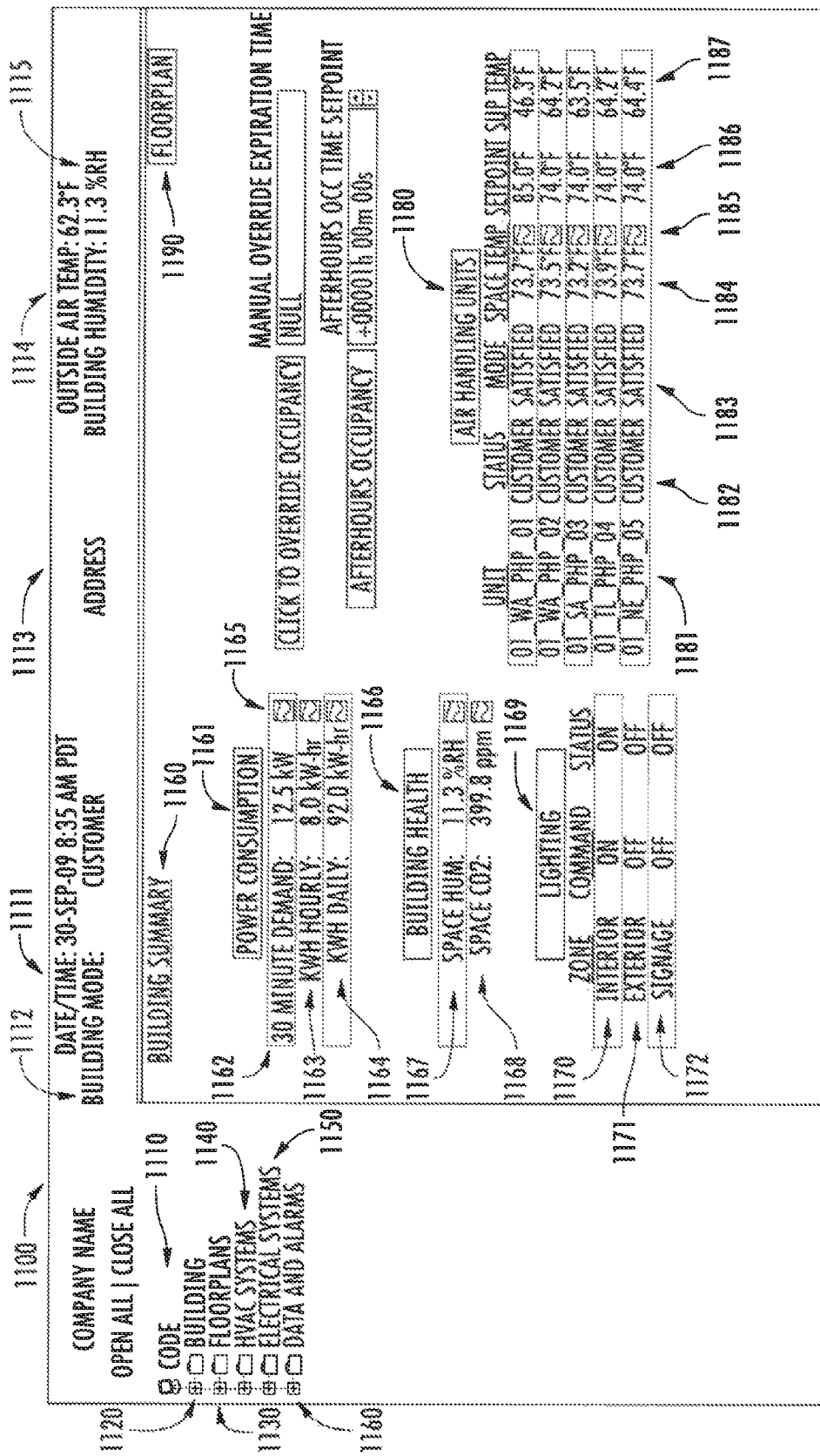
Figure 12:
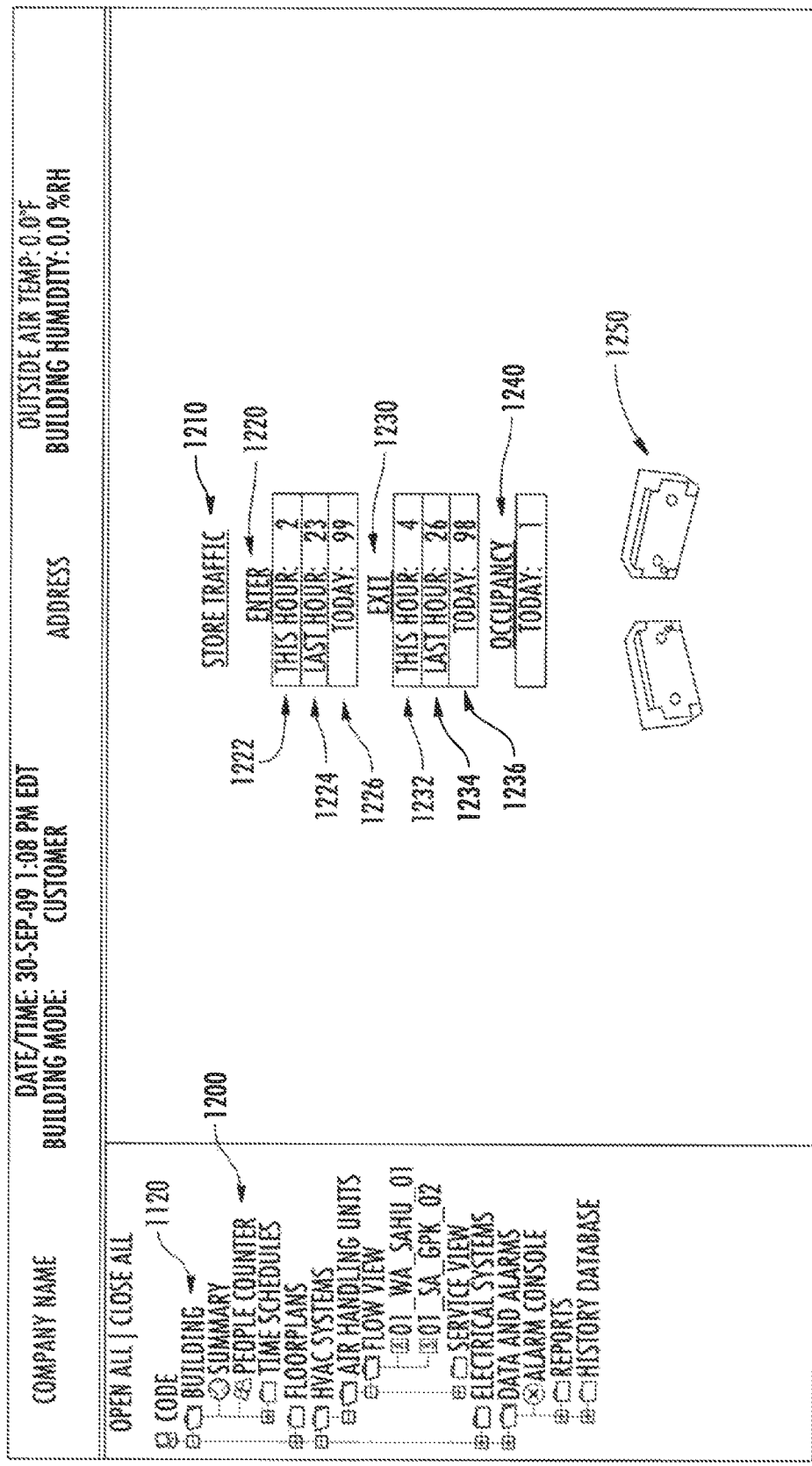
Figure 13:
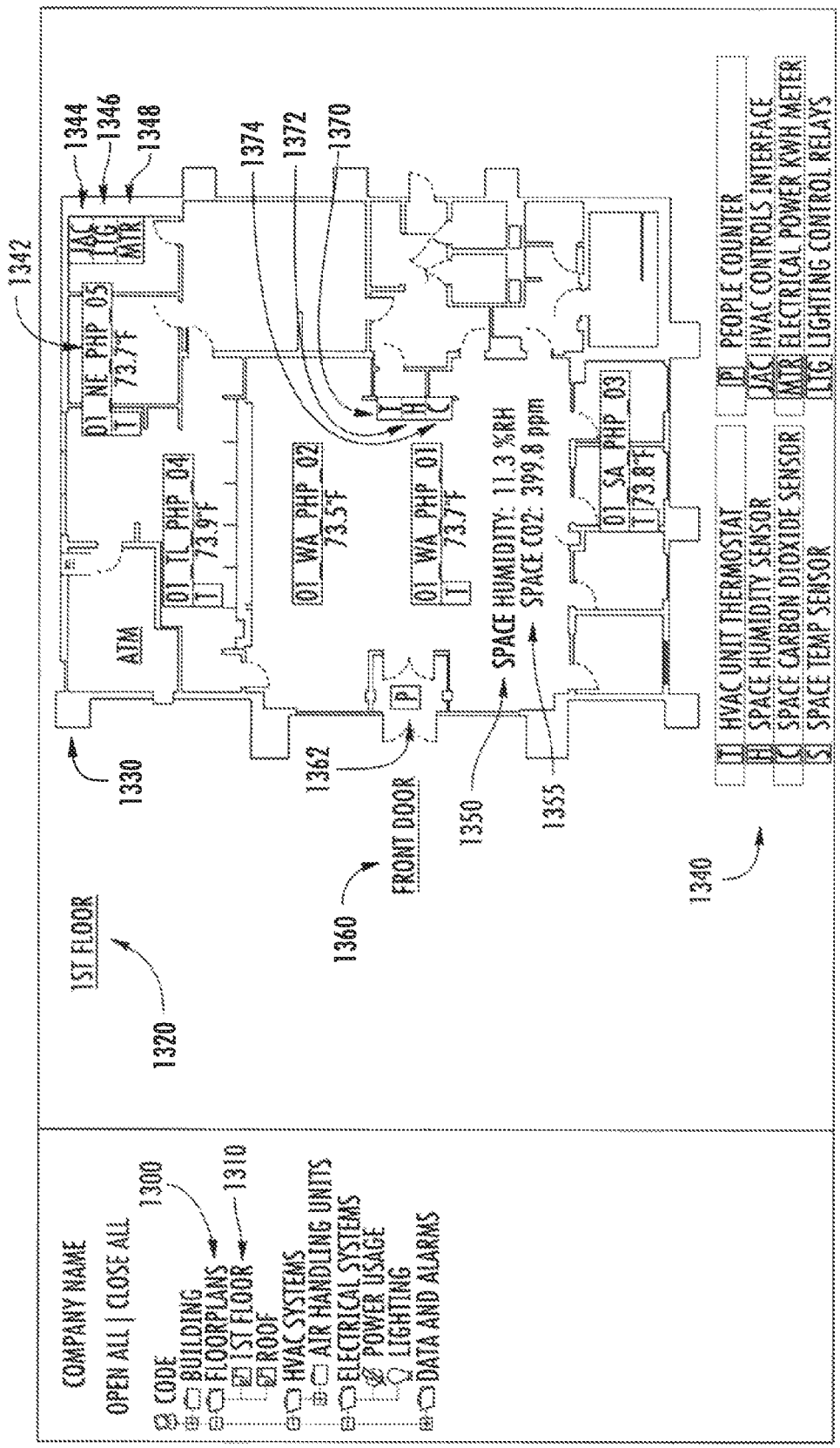
Figure 14:
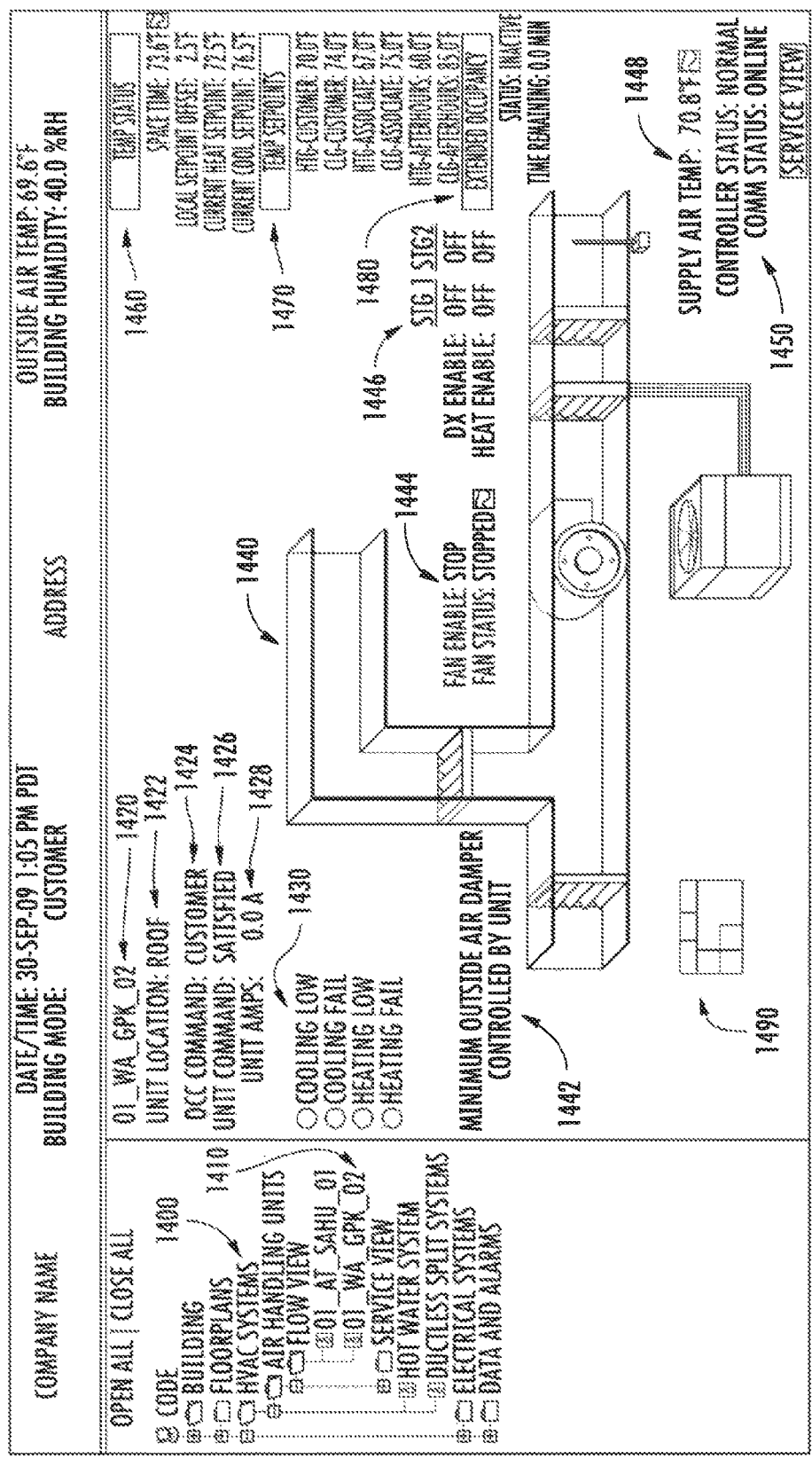
Figure 15:
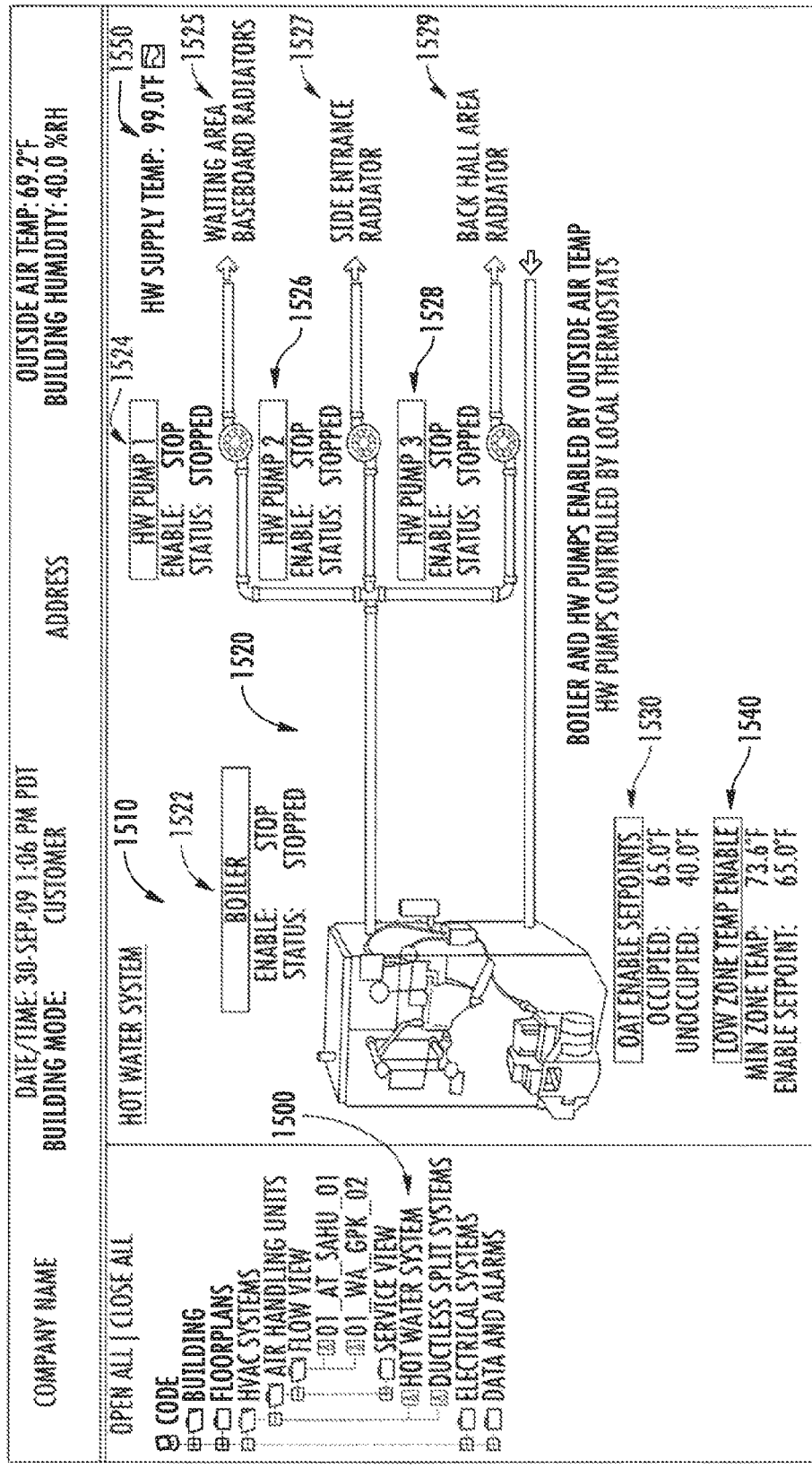
Figure 16:
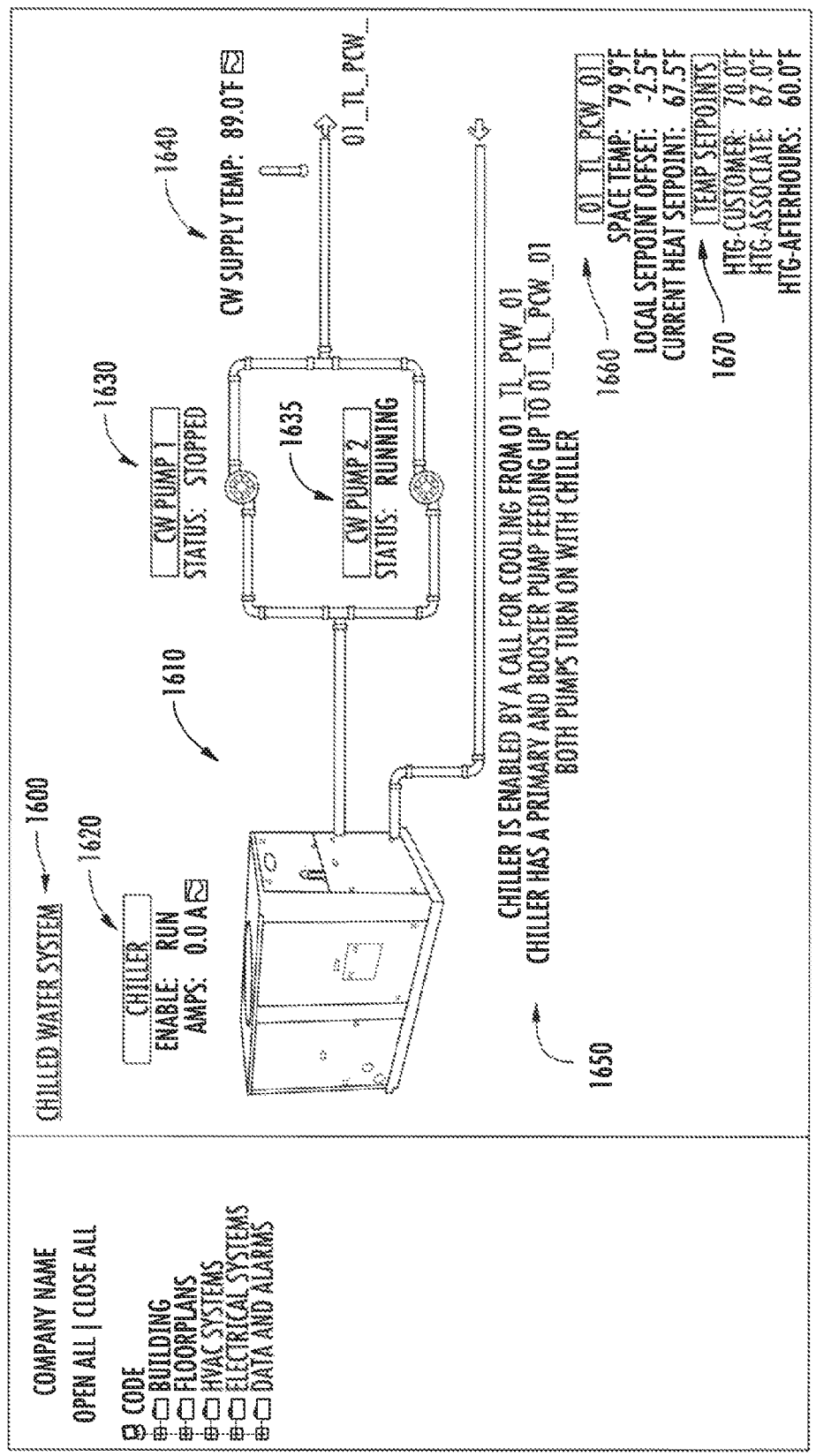
Figure 17:
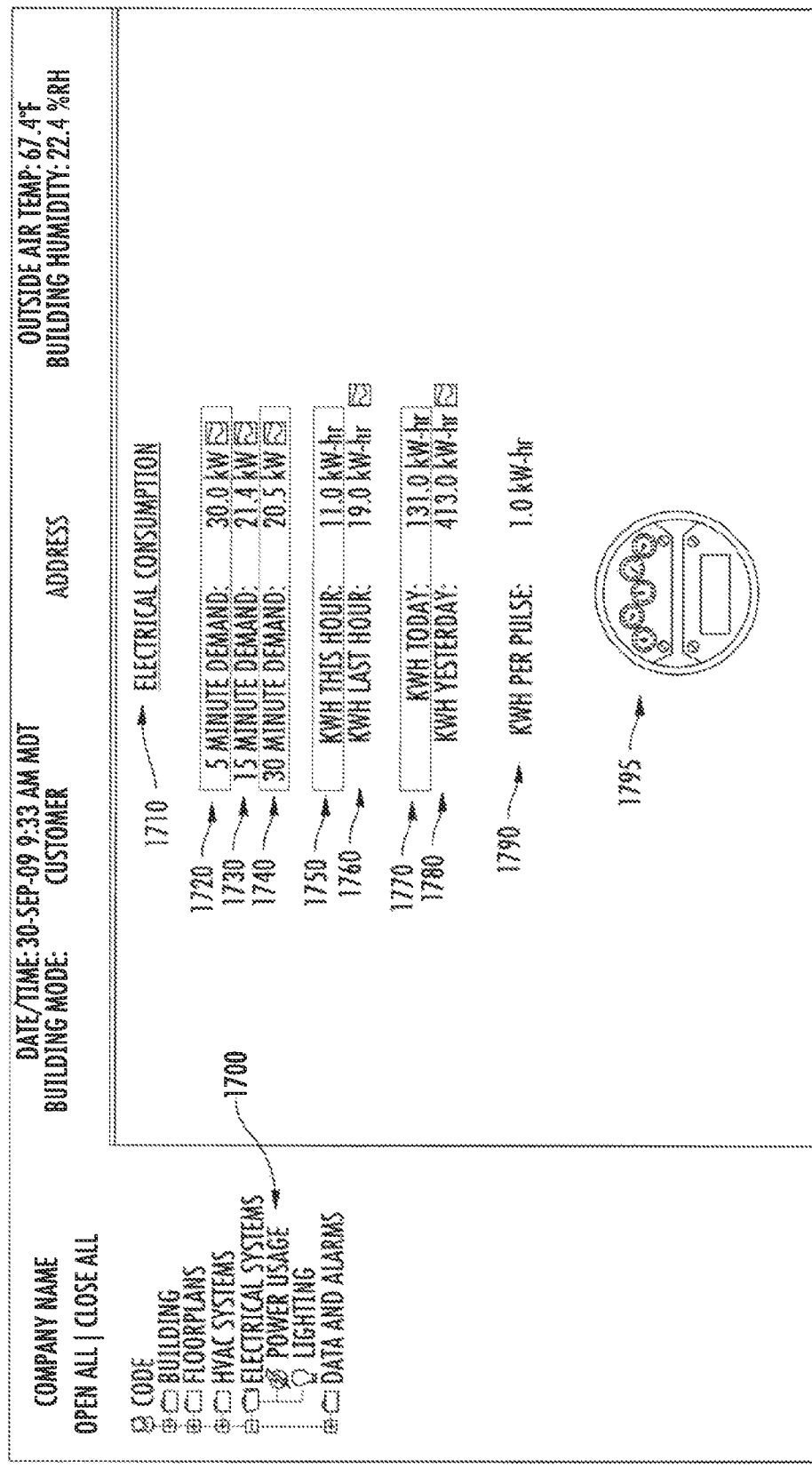
Figure 18:
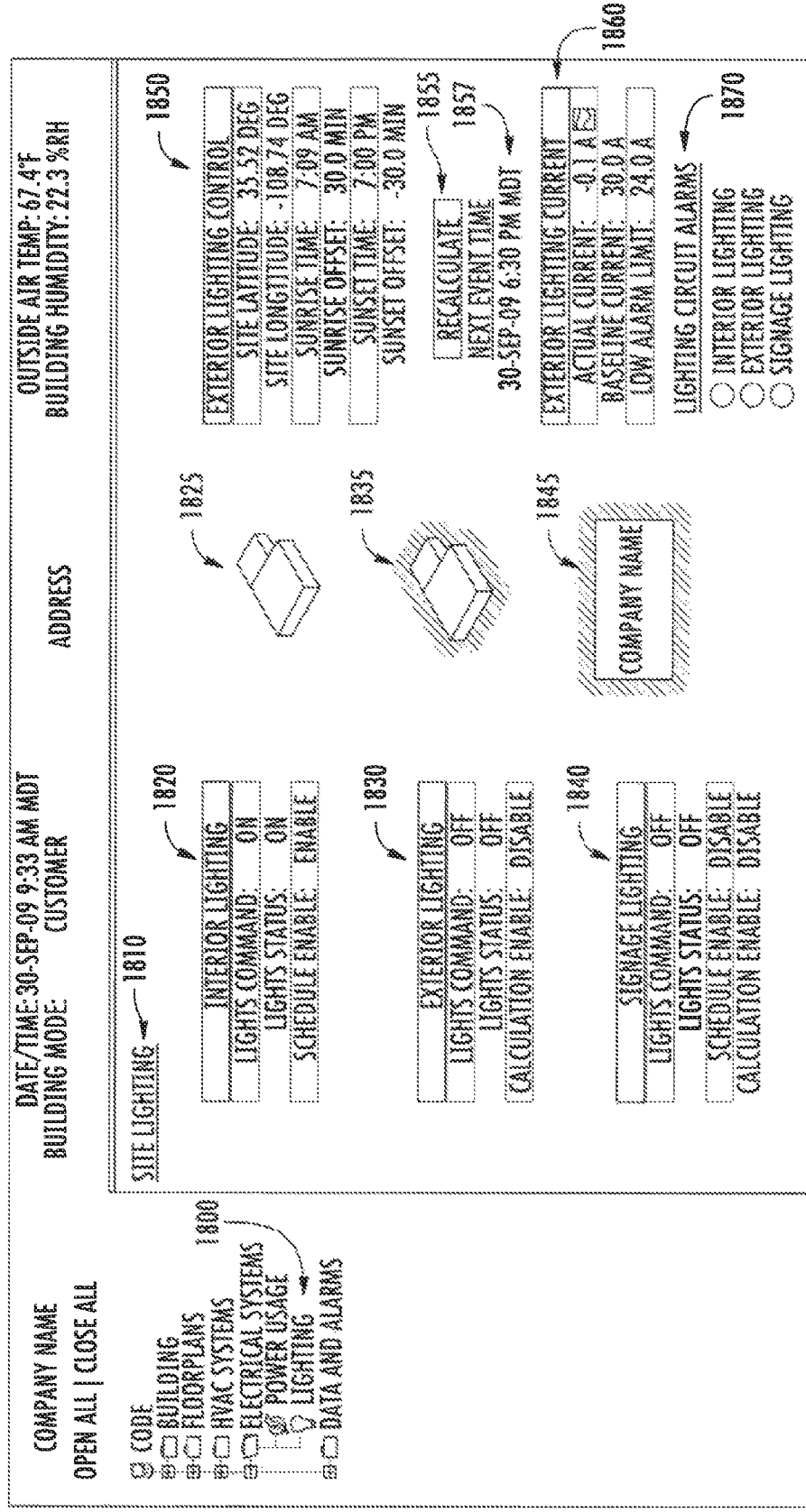
Figure 19:
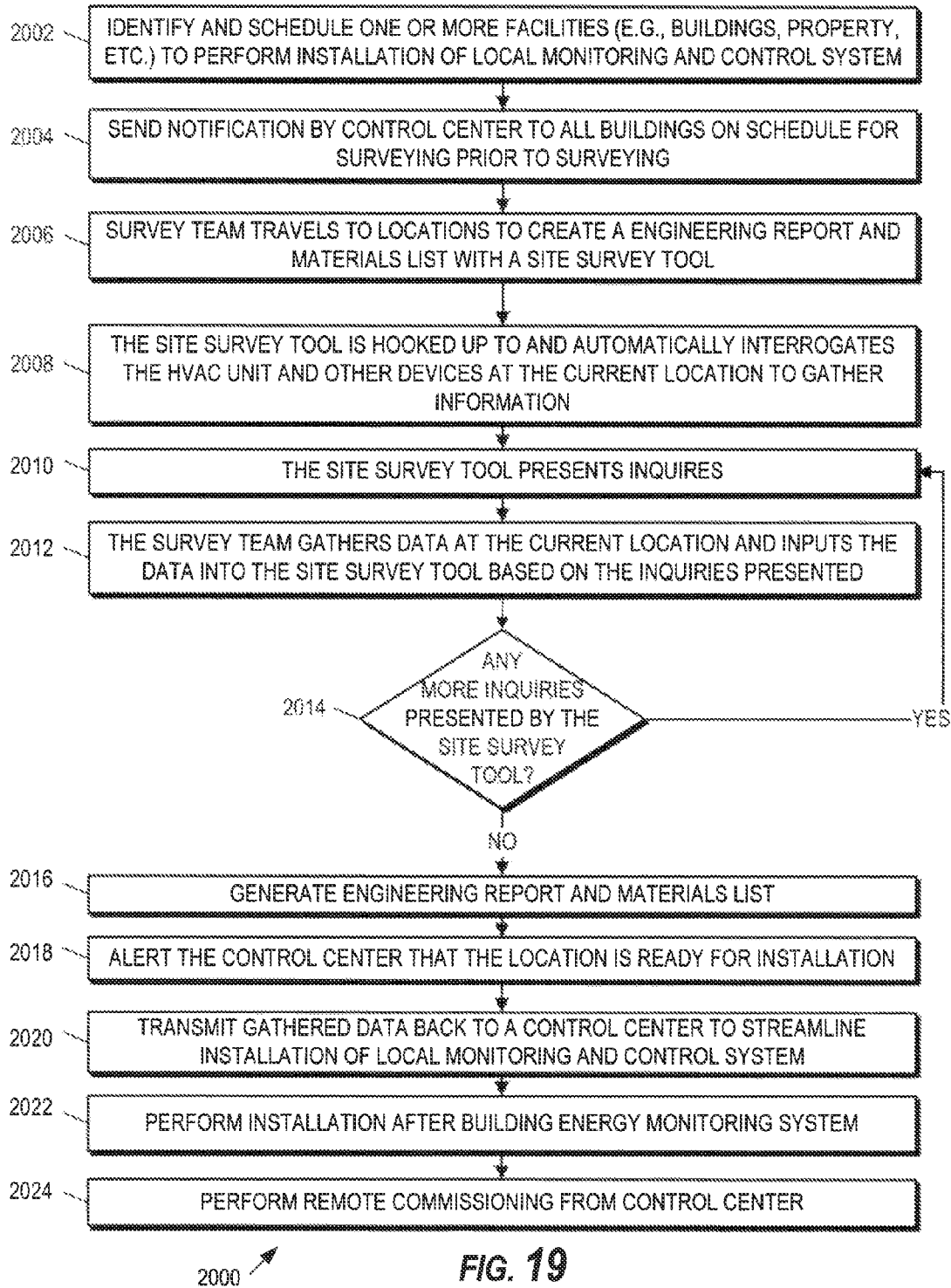
Figure 20:
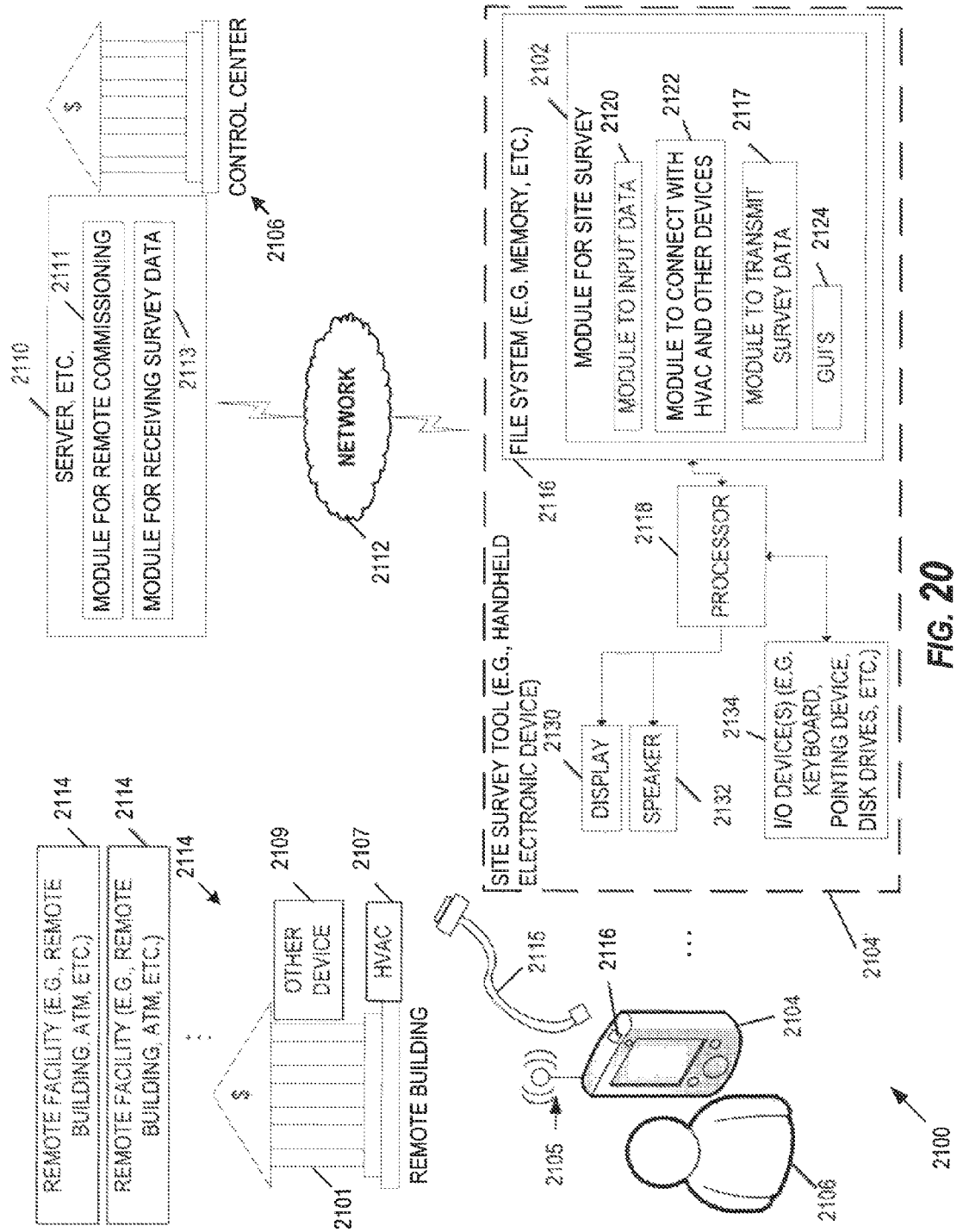

Having thus described embodiments of the invention in general terms, reference will now be made to the accompanying drawings, wherein:

FIG. 1 provides a block diagram illustrating an energy maintenance and management system, in accordance with an embodiment of the present invention;

FIG. 2 provides a block diagram illustrating a local monitoring and control system, in accordance with an embodiment of the present invention;

FIG. 3 provides a block diagram illustrating a control panel, in accordance with an embodiment of the present invention;

FIG. 4 provides a block diagram illustrating a lighting monitoring and control system, in accordance with an embodiment of the present invention;

FIG. 5 provides a block diagram illustrating several single point devices used in the energy maintenance and management system, in accordance with an embodiment of the present invention;

FIG. 6 provides a block diagram illustrating a HVAC monitoring and control system, in accordance with an embodiment of the present invention;

FIG. 7 provides a block diagram illustrating a boiler monitoring and control system, in accordance with an embodiment of the present invention;

FIG. 8 provides a block diagram illustrating a chiller monitoring and control system, in accordance with an embodiment of the present invention;

FIG. 9 provides a block diagram illustrating a central monitoring and control system, in accordance with an embodiment of the present invention;

FIGS. 10A, 10B, and 10C provide a flow chart illustrating various processes performed by the energy maintenance and management system, in accordance with an embodiment of the present invention;

FIG. 11 provides a portion of an exemplary graphical user interface presented by the central monitoring and control system, in accordance with an embodiment of the present invention;

FIG. 12 provides another portion of an exemplary graphical user interface presented by the central monitoring and control system, in accordance with an embodiment of the present invention;

FIG. 13 provides another portion of an exemplary graphical user interface presented by the central monitoring and control system, in accordance with an embodiment of the present invention;

FIG. 14 provides another portion of an exemplary graphical user interface presented by the central monitoring and control system, in accordance with an embodiment of the present invention;

FIG. 15 provides another portion of an exemplary graphical user interface presented by the central monitoring and control system, in accordance with an embodiment of the present invention;

FIG. 16 provides another portion of an exemplary graphical user interface presented by the central monitoring and control system, in accordance with an embodiment of the present invention;

FIG. 17 provides another portion of an exemplary graphical user interface presented by the central monitoring and control system, in accordance with an embodiment of the present invention;

FIG. 18 provides another portion of an exemplary graphical user interface presented by the central monitoring and control system, in accordance with an embodiment of the present invention;

FIG. 19 illustrates a flow chart of a method for site survey and installation in accordance with an embodiment of the present invention;

FIG. 20 illustrates a block schematic diagram of an exemplary system for site survey, in accordance with an embodiment of the present invention; and FIGS. 21A through 21R illustrate exemplary graphical user interfaces presented by a site survey tool, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a facility maintenance and management system 1 in accordance with an embodiment of the present invention. As illustrated in FIG. 1, the facility maintenance and management system 1 includes an "Intelligent Command and Control Center" ("IC3") 4 where an organization can monitor and manage energy-using systems and, in some cases, other happenings (e.g., occupancy, weather, etc.) at a plurality of the organization's remote facilities, such as the remote facilities 6, 7 and 8 illustrated in FIG. 1. For example, in one embodiment of the invention, the organization is a bank having tens of thousands of bank branches around the world. In such an example embodiment of the invention, the IC3 4 allows the bank to control the lighting, HVAC systems, boilers, chillers, and/or other energy-using systems at all of its branches at one remote central command and control center. In some such embodiments, the IC3 4 can also remotely monitor certain conditions at the facility, such as occupancy, people flow, temperature, humidity, ambient light, other weather-related data, and/or the like. In some such embodiments, the IC3 4 can turn the various energy-using systems on and off based on the conditions monitored at each branch and, in some cases, the IC3 4 is configured to automatically do so in a way that provides a comfortable environment for the bank's employees and customers while at the same time increasing the efficiency of the various energy-using systems. In some embodiments of the invention, the IC3 4 can also use the data that it gathers from the branches to recognize, diagnose, troubleshoot, fix, and/or create work orders for problems at the branches.

In the embodiment of the invention illustrated in FIG. 1, the IC3 4 includes a central monitoring and control system 900 and one or more IC3 operators 12. The central monitoring and control system 900 is described in greater detail hereinbelow with reference to FIG. 9. Each of the remote facilities, such as remote facility 6, includes a local monitoring and control system 200, one or more power-using systems 22, and, in some cases, one or more facility operators 24. The local monitoring and control system 200 is described in greater detail hereinbelow with reference to FIGS. 2-8. The central monitoring and control system 900 is communicably coupled to each remote facility's local monitoring and control system 200 via a network, such as a wide area network (WAN) 2. The WAN 2 may provide for wireline, wireless, or a combination of wireline and wireless communication between devices in the network. In this way, the WAN 2 allows for the communication of information between the central monitoring and control system 900 and each local monitoring and control system 200. In one embodiment, the WAN 2 includes the Internet.

In general, a facility's local monitoring and control system 200 is configured to monitor the workings of the facility's energy-using systems 22 and/or other facility happenings. The local monitoring and control system 200 then gathers and processes the monitored data and communicates certain data to the central monitoring and control system 900 at the IC3 4. The central monitoring and control system 900 and/or the IC3 operators 12 can then use this data to identify problems at the facility 6, identify inefficiencies at the facility 6, record events at the facility 6, troubleshoot problems at the facility 6, instruct facility operators 24 to perform certain tasks, control systems at the facility 6, and/or the like, as described in greater detail hereinbelow. In one embodiment, the IC3 operators 12 include technicians skilled in the areas of the different facility energy-using systems 22, such as HVAC technicians, electricians, lighting technicians, systems engineers, and/or the like.

It should be appreciated that, in some embodiments of the invention, the remote facilities 6, 7, and 8, are not all the same and may vary in the types, combinations, and/or configurations of energy-using systems 22 and/or other systems. In one embodiment, the remote facilities are categorized (e.g., as a "Type A" remote facility, "Type B" remote facility, etc.) based on each remote facility's particular systems and setups. Such categorizations can then be used to determine which of a plurality of possible prearranged local monitoring and control system 200 kits should be installed at the facility. As described in greater detail herein below, in some embodiments, the specific components making up the local monitoring and control system 200 for each remote facility are determined automatically by a site survey tool, described in greater detail hereinbelow with reference to FIGS. 19-21.

For example, in the exemplary embodiment of the invention described above where the organization is a bank and the remote facilities include bank branches, one category of bank branch may be "free-standing branches" and another category of bank branch may be "attached branches." The "free-standing branches" represent branches that are free-standing buildings occupied/controlled only by the bank, while the "attached branches" represent branches within or attached to a building occupied/controlled by other tenants. Such a distinction may be important for configuring the local monitoring and control system 200 for the bank branches since, at attached branches, some systems may be shared between the bank and the other tenants. In one embodiment, the site survey tool described in greater detail hereinbelow with reference to FIGS. 19-21 surveys each bank branch and identifies the appropriate configuration of the local monitoring and control system 200 for each bank branch based on the answers to questions in a prearranged survey and communication between the site survey tool and one or more of the energy-using systems 22 located at each branch.

It should be understood that, although some example embodiments of the invention are described herein as being used in bank facilities, other embodiments of the invention can work equally well in other applications. For example, embodiments of the invention could be used for restaurant organizations, building management organizations, retail store organizations, governmental organizations, and/or other business or non-business organizations.

Referring now to FIG. 2, an illustration is provided of a local monitoring and control system 200, in accordance with an embodiment of the present invention. As illustrated in FIG. 2, the local monitoring and control system 200 includes a control panel 300 communicably coupled to systems configured to monitor and/or control the electrical systems located at the facility 6 and/or other happenings at the facility 6. In the illustrated embodiment of the invention, these monitoring and/or control systems include, but are not limited to: (1) a lighting monitoring and control system 400 configured to monitor and control the facility's lighting systems; (2) several single point devices 500, such as sensors, configured to sense temperature, light, movement, people, humidity, carbon dioxide ($CO_2$), and/or the like; (3) an HVAC monitoring and control system 600 configured to monitor and control the facility's HVAC system; (4) a boiler monitoring and control system 700 configured to monitor and control the facility's boiler system (if applicable); and (5) a chiller monitoring and control system 800 configured to monitor and control the facility's chiller system (if applicable). The control panel 300 communicates data, commands, electrical signals, and/or the like with these monitoring and control systems via a network, such as a local area network (LAN) 250. The LAN 250 may provide for wireline, wireless, or a combination of wireline and wireless communication between the devices in the network. In one embodiment, the LAN 250 includes a wired/wireless communication network, including such devices as wired/wireless modems, routers, etc., that communicably couple the control panel 300 with one or more of the facility's other devices. In some embodiments, the LAN 250 also includes an electrical network that electrically couples the control panel 300 with one or more of the facility's other devices and one or more of the facility's electrical power circuits. In one embodiment, the LAN 250 is operated by the organization and serves only the local facility 6.

FIG. 3 provides a block diagram illustrating the control panel 300 in greater detail, in accordance with an embodiment of the present invention. As illustrated in FIG. 3, in one embodiment of the invention, the control panel 300 includes a processing device 320 operatively coupled to a WAN communication interface 310, a LAN communication interface 340, a memory device 350, and, in some cases, a user interface 330.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. For example, in one embodiment of the control panel 300, the memory device 350 includes a local monitoring and control application 355 having computer-executable program code that instructs the processing device 320 to operate the WAN communication interface 310, the LAN communication interface 340, and the user interface 330 to perform certain communication functions of the control panel 300 described herein. The computer-executable program code of the local monitoring and control application 355 may also instruct the processing device 320 to perform certain logic, data processing, and data storing functions of the control panel 300 described herein.

As used herein, a "communication interface" generally includes a modem, server, transceiver, and/or other device for communicating with other devices on a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users. As used herein, a "memory device" generally refers to a device or combination of devices including one or more forms of computer-readable media for storing instructions, computer-executable code, and/or data thereon. Computer-readable media is defined in greater detail hereinbelow.

Referring again to FIG. 3, the WAN communication interface 310 is a communication interface having one or more communication devices configured to communicate with one or more other devices on the WAN 2, including the central monitoring and control system 900. The processing device 320 is configured to use the WAN communication interface 310 to transmit and/or receive data and/or commands to and/or from the central monitoring and control system 900.

The LAN communication interface 340 includes a communication interface having one or more communication devices configured to communicate data and/or electrical signals to and/or from one or more other devices on the LAN 250, including the various monitoring and control systems and single point devices described hereinbelow. The processing device 320 is configured to use the LAN communication interface 340 to communicate data, commands, electrical signals, and/or the like to and/or from these other systems or devices.

The processing device 320 is configured to use the LAN communication interface 340 to gather data from the various monitoring systems. The processing device 320 then temporarily stores the data in the memory device 350 before sending the data or some modified portion of the data to the central monitoring and control system 900 using the WAN communication interface 310. In this regard, in one embodiment of the invention, the memory device 350 includes datastores of, for example: (1) lighting system status and power data 355; (2) single point device data 362; (3) HVAC power, temperature, and/or flow data 364; (4) boiler power, temperature, and/or flow data 366; and (5) chiller power, temperature, and/or flow data 368. The lighting system status and power data 355 may include data about whether one or more of the lighting systems in the facility 6 are on or off, the energy drawn by the one or more different lighting systems or other energy-related data (e.g., electrical resistance data, electrical current data, etc.), when any automatic lighting schedules are overridden by someone in the facility 6, and/or the like. The single point device data 362 may include data from any number of single point devices described hereinbelow, such as, for example, occupancy data 363 including data received from one or more people counters located at the entrances and exits of the facility 6. The HVAC, blower, and chiller data 364, 366, and 368, respectively, may include, for example, temperature data and/or flow data taken from different locations within or outside of these systems, energy data or energy-related data, system status data (e.g., on/off), system override data, and/or the like. The various types of data collected by embodiments of the present invention are described in greater detail hereinbelow with reference to FIGS. 4-8.

In some embodiments of the invention, the processing device 320 performs some processing of the data according to instructions specified in the local monitoring and control application 355. For example, in one embodiment, the processing device 320 "buckets" the data to reduce the amount and size of the data sent to the central monitoring and control system 900. For example, the control panel 300 may periodically check the temperature of the air exiting the HVAC system and "bucket" this data by only storing temperature changes and the length of time between each temperature change. In this way, the amount of data sent to the central monitoring and control system 900 can be significantly reduced relative to a system where each and every temperature reading is sent to the central monitoring and control system 900. This can be especially important in a system where there are tens of thousands of remote facilities constantly sending data to the central monitoring and control system 900. In some embodiments, the processing device 320 may further process the data by converting, encrypting, summarizing, compressing, validating, and/or scrubbing the data prior to sending the data, or portions thereof, to the central monitoring and control system 900. In some embodiments, the control panel 300 is further configured to use the data to identify problems or potential problems in the facility's systems and then communicate alerts to the central monitoring and control system 900 while, in other embodiments, the control panel 300 merely sends the data to the central monitoring and control system 900 where the central monitoring and control system 900 and/or the IC3 operators 12 use the data to identify problems or potential problems.

In addition to gathering, processing, and communicating data from the local facility 6 to the central monitoring and control system 900, the control panel 300 is further configured to receive commands or other information from the central monitoring and control system 900 and either relay these commands to the appropriate system control devices or take other appropriate action to control the systems in the facility 6 or alert the appropriate facility operators 24.

In one embodiment of the invention, the control panel 300 is mounted in or near an electrical storage room containing the electrical equipment for the facility 6, since, in some embodiments, the control panel 300 connects to one or more electrical circuits related to the LAN 250, lighting systems, HVAC systems, blower systems, chiller systems, and/or the like. In one embodiment, a network cable or wireless network modem is connected to the control panel 300 during installation in order to allow the control panel 300 to communicate with the central monitoring and control system 900 over the WAN 2. In one embodiment, a second network cable or wireless network modem is connected to the control panel 300 during installation in order to allow the control panel 300 to communicate with the various facility control and monitoring systems over the communication portion of the LAN 250.

As further illustrated in FIG. 3, in some embodiments of the invention, the control panel 300 includes a user interface 330. For example, in one embodiment, the user interface 330 includes one or more indicator LEDs or other lights for alerting facility operators 24 or other on-site technicians of potential problems or of the status of the system or any system component, network connection, and/or the like. The user interface 330 may also include, in some embodiments, a monitor and keyboard, touch screen, one or more data ports for downloading data or troubleshooting codes, a buzzer or speaker for sounding alarms, and/or the like.

Referring now to FIG. 4, a block diagram is provided illustrating a lighting monitoring and control system 400, in accordance with an embodiment of the present invention. As illustrated in FIG. 4, in one embodiment of the invention, the lighting monitoring and control system 400 distinguishes between three lighting zones at the facility 6: an interior lighting zone 420, an exterior lighting zone 440, and a signage lighting zone 460. In this way, the central monitoring and control system 900 can distinguish between data received from each of these lighting zones and separately control each of these different lighting zones. It will be appreciated that, in the illustrated embodiment, the lighting zones are determined based on logical distinctions between lighting based on function and that, in other embodiments, the lighting system at a facility 6 may include more or less zones and/or different zones based on the particular facility, the different types of lighting at the facility, and/or the existing electrical infrastructure at the facility that may at least partially determine which lighting can be separately controlled.

In some instances, any existing time clocks used to control the lighting at the facility 6 before installation of the local monitoring and control system 200 are removed or disengaged so that the timing of the lighting can be controlled by the central monitoring and control system 900 after installation. In some embodiments of the invention, a lighting power meter, such as a current transducer 448, is operatively coupled to the control panel 300 and to one or all of the lighting systems in order to allow the control panel 300 to monitor the lighting functionality and maintenance needs.

In some embodiments, the electrical circuits containing the lighting systems also include other systems thereon, such as refrigerators, computers, security systems, and/or other equipment. In such embodiments, the central monitoring and control center 900 will typically not take control of these lighting systems unless it is easy to separate the lighting systems from any non-lighting systems on the circuit. Instead, in such embodiments, the central monitoring and control system 900 may simply monitor the status of the lighting systems, using, for example power meters, photocells, and/or the like.

The control panel 300 includes, as part of the LAN communication interface 340, lighting relays for each respective lighting zone. If the lighting system has more zones and/or more circuits than the control panel 300 can handle, auxiliary contacts can, in some cases, be run in series.

In one embodiment of the invention, the interior lighting zone 420 includes all or most of the lights that are within the facility 6 (except for, in some cases, emergency lighting, such as emergency exit lights). The interior lighting zone 420 uses an interior relay 425 which is connected over the LAN 250 to the control panel 300. In some embodiments of the invention, the interior relay 425 is hardwired to the control panel 300. In other embodiments, a wireless device, such as a modem or other wireless transceiver, allows the relay 425 to communicate with the control panel 300.

In some instances, the interior lighting zone 420 is all on the same timing schedule at the central monitoring and control system 900. In such instances, only one interior relay 425 is needed for all of the interior lighting. However, in other instances, the interior lighting is split up into multiple zones that are subsets of the interior lighting zone 420. For example, multiple interior lighting zones may be used if the facility is large and has employee offices separate from the customer areas, or if the facility has multiple tenants on different timing schedules all controlled by the central monitoring and control system 900 and having different lighting schedules.

In some embodiments of the invention, if dividing-up the interior lighting zone 420 into multiple separately-manageable interior lighting zones provides cost and energy savings, then the IC3 4 will often divide the interior lighting zone 420 into multiple zones. In such embodiments where the IC3 4 manages multiple interior lighting zones, each zone uses separate interior relays 425 for each interior lighting zone to allow the central monitoring and control system 900 to control the lighting schedule of each zone independently.

In some embodiments of the invention, the employees and/or other authorized personnel can activate the interior lights outside of the lighting schedule dictated by the central monitoring and control system 900. For example, in one embodiment of the invention, personnel can activate the lights by crossing one or more of the people counters 510, using an override feature on the space temperature sensor 540, using an override feature on the interior relay 425, or by calling the IC3 4. For example, these override features may be used by an employee working off-hours at the facility 6 or by cleaning or maintenance crews working off-hours. In this way, the IC3 4 can reduce the energy costs associated with the facility 6 by controlling the interior lighting so that a minimum amount of interior lights are on at any given time, while still allowing for employees or other authorized personnel to enter the facility 6 and activate the lights during off-hours. In one embodiment, the override system available to employees includes a switch or other user interface that communicates the override to the relay via the control panel 300. In other embodiments, the override request is communicated to the central monitoring and control system 900 which then approves and initiates the override by sending a signal back to the control panel 300 to turn the lights on. In some embodiments, the override times-out after some predefined period of time or after some particular event. For example, the override may be configured so that it times-out some predefined period of time after motion is last detected at a motion detector within a particular zone in the facility 6.

In one embodiment of the invention, the exterior lighting zone 440 includes such lights as pole lights, flood lights, parking lights, side-mounted lights, security lights, and/or other exterior lights of the facility 6. In one embodiment of the invention, the exterior lighting zone 440 includes, but is not limited to, an exterior relay 445 and a lighting power meter, such as an exterior current transducer 448. As is the case with the interior relay 425, the exterior relay 445 for the exterior lighting zone 440 is connected over the LAN 250 to the control panel 300. In some embodiments, the exterior relay 445 is hardwired to the control panel 300. In other embodiments, a wireless device, such as a modem or other wireless transceiver, allows the exterior relay 445 to communicate with the control panel 300.

In some embodiments of the invention, the electrical circuit for the exterior lighting zone 440 is run through an external current transducer 448. The external current transducer 448 captures the current used by all of the lights of the exterior lighting zone 440 when the lights are working properly. When a light in the exterior lighting zone 440 goes out, such as when a bulb is blown or the wiring becomes faulty, then the exterior current transducer 448 will experience a drop in current which will be communicated by the control panel 300 to the central monitoring and control system 900 to alert the central monitoring and control system 900 and/or the IC3 operators 12 of a potential problem with the exterior lights at that facility 6. For example, in one embodiment of the invention, when the current transducer 448 drops below 80% of the normal value, the control panel 300 sends data about the drop to the central monitoring and control system 900, which then sounds an alarm by notifying the appropriate facility operator (s) 24 of the issue. In some embodiments of the invention, if all of the exterior lighting zone 440 will not fit on one control panel or if circuits for the exterior lighting zone 440 are fed from multiple panels, additional current transducers 448 may be used to monitor the exterior lighting zone 440 functionality.

As described in greater detail hereinbelow with reference to the detailed description of the central monitoring and control system 900, in some embodiments of the invention the IC3 4 maintains historical records of data, such as lighting status and performance data, for each of the remote facilities. It should be appreciated that remotely monitoring and storing data indicating whether the external lights at a particular facility are/were working properly can be important information to know for safety and liability reasons. For example, if a light burns-out over an ATM during off-hours, when no one is at the facility, there may be a potential safety hazard. Embodiments of the present invention can help the organization recognize and address these potential hazards much more quickly so that the organization can take appropriate actions to investigate and remedy the potential hazard in a more timely fashion. Embodiments of the present invention can also be used to identify whether there was, in fact, a malfunctioning system, such as a burnt-out light, at some specific date and time in the past.

In some example embodiments of the system, the exterior lighting zone 440 will remain on all night. However, depending on the how the outside of the facility 6 is already lit by streetlights or adjacent buildings, the hours of operation for the exterior lighting zone 440 can be determined on a case by case basis. For example, it may, in some instances, be desirable to keep some exterior lights on to light, for example, a 24-hour ATM location outside of the facility 6. However, it may be desirable to turn other exterior lights off at times during the night because streetlights provide enough light in areas outside of the facility during the very early hours in the morning when no one will be using the facility anyway. Therefore, in some embodiments of the invention, IC3 4 may divide up the exterior lighting zone 440 into sub zones, each with its own one or more relays controlled remotely by the central monitoring and control system 900.

In some embodiments, the intensity and/or scheduling of the exterior lighting is based on other facility conditions monitored by the central monitoring and control system 900, such as the ambient exterior light, sunrise and sunset, the functionality of one or more lights or lighting systems, the weather, the moon, and/or the like. Some such embodiments are described in greater detail hereinbelow.

In one embodiment of the invention, the signage lighting zone 460 of the lighting monitoring and control system 400 includes lights for monument signs, wall mounted signs, ATM signs, and/or other signage. In one embodiment of the invention, the signage lighting zone 460 includes, but is not limited to, a signage relay 465. As is the case with the interior relays 425 and exterior relays 445, the signage relays 465 are connected over the LAN 250 to the control panel 300. In some embodiments, each signage relay 465 is hardwired to the control panel 300. In other embodiments, a wireless device, such as a modem or other wireless transceiver, allows the signage relays 465 to communicate with the control panel 300.

In some instances, the signage lighting zone 460 is turned off at all branches according to some schedule set by the IC3 4, such as between 1:00 am and 6:00 am. However, in other instances, the signage lighting zone 460 is controlled on a case by case basis by the IC3 4 as a trade-off between marketing and cost savings and may depend on the facility 6, the type of signage, and/or facility conditions monitored by the central monitoring and control system 900. For example, in the banking context, in large cities where branches have 24-hour ATMs and many businesses are open 24-hours a day, seven days a week, IC3 4 may decide to leave the signage lights on all night in order to provide a signal to customers that the ATM is available all night and in order to advertise the bank to the many people out and about throughout the night in such large cities.

FIG. 5 provides a block diagram illustrating several single point devices 500 used in the facility maintenance and management system 1, in accordance with an embodiment of the present invention. As illustrated, in one embodiment of the invention, the single point devices 500 can include but are not limited to, one or more: (1) people counters 510; (2) outside air temperature sensors 520; (3) space $CO_2$ and/or humidity sensors 530; (4) space temperature sensors 540; (5) facility power meters 550, such as facility current sensors; (6) motion detectors 560; and/or (7) outside photocells 570. Depending on the embodiment of the invention, some, all, or multiple numbers of these single point devices 500 are installed in the various facilities based upon the specific configuration of each facility, information needs, and/or other factors. In one embodiment, determining what components are included and installed at each facility is determined by an installation site survey, the answers to which are sent back to the IC3 4 before the hardware kits are assembled and shipped to the facility or an installation group charged with installing the local monitoring and control system 200 at the facility. FIGS. 19-21 describe a "site survey tool" used in some embodiments of the invention to determine which combination and number of system components should make up the local monitoring and control system 200 of each facility.

Referring again to FIG. 5, the people counters 510 are devices that can identify and/or count the presence of a person at or moving through a particular location. For example, a people counter 510 may include, for example, a turnstile, an infrared sensor, a motion detector, a weight sensor, a door sensor, a thermal sensor, a video camera coupled with recognition software, an electronic device where a person can manually enter people count data, and/or any other type of sensor capable of identifying a person moving through a particular point in space.

In one embodiment of the invention, people counters 510 are installed at each entrance and exit of the facility 6. In this way, the central monitoring and control system 900 can determine the occupancy of the facility at any time by, for example, subtracting the number of people that have exited the facility over a period of time from the sum of the number of people in the building at the beginning of the period of time and the number of people who have entered the building during the period of time. In some embodiments of the invention, the people counters 510 are wirelessly connected the control panel 300, while, in other embodiments, the people counters 510 are hard-wired to the control panel 300.

Knowing the occupancy of each facility can be important to the organization for many reasons, such as for knowing automatically when lights can be turned off and on at the facility, knowing how many people are in the building in the event of an emergency, reconstructing past events, knowing automatically when to adjust HVAC systems or other facility systems, and/or the like. For example, the people counters 510 can provide the IC3 4 with information that notifies the central monitoring and control system 900 that employees or maintenance crews have entered the facility before the scheduled facility hours. In such an example, the IC3 4 will then know that, if the lighting system has been overridden, then it was done because there are people in the facility. In one embodiment of the invention, information from the people counters 510 are used by the central monitoring and control system 900 to activate or deactivate some or all of the interior lighting zone 420 when it is determined that occupancy goes up from or down to zero, respectively.

Furthermore, as data on the occupancy rates for each remote facility is gathered over time, the central monitoring and control system 900 can, in one embodiment, learn to pre-heat and pre-cool each individual facility based on the history of the occupancy rates and changes in the occupancy rates at the facility. For example, the people counters 510 may indicate to the central monitoring and control system 900 that between 11:30 am and 1:30 pm a particular facility has the highest occupancy levels for the day, and during that time, the space temperature sensors 540 indicate that the temperature within the facility increases from 72 to 76 degrees. Armed with this information, the IC3 4 can schedule the HVAC systems 600 to start cooling the facility down to 68 degrees at 11:15 am in anticipation of the increased number of customers, which normally increases the temperature from 72 to 76 degrees but will now increase the temperature from 68 back to 72 degrees. In some embodiments, these trends and responses are recognized and programmed into the central monitoring and control system 900 by the IC3 operators 12. In other embodiments, however, the central monitoring and control system 900 uses various techniques, such neural networks or other artificial intelligence applications, to automatically identify such trends, anticipate problems, and program remedial responses to any problems.

Referring again to FIG. 5, the outside air temperature sensor 520 is a temperature sensor configured to measure the air temperature outside of the facility 6. The outside air temperature can be useful to the IC3 4 to, for example, help determine how to run the facility's HVAC system. In order to obtain accurate outside temperatures, in one embodiment, the outside air temperature sensor 520 is mounted on the rooftop HVAC unit, on the north side of the building facing away from direct sunlight and a suitable distance from any mechanically induced heat. It will be understood that such an installation location is ideal for many buildings in the United States. However, where the facility maintenance and management system 1 is implemented in other areas around the globe, the ideal position of the outside air temperature sensor 520 may be different. In some instances when the outside air temperature sensor 520 is being installed in a facility attached to or within another organization's facility and where roof access is limited, the outside air temperature sensor 510 can be located outside of the mechanical room wall or other facility wall. As with other single point devices 500, the outside air temperature sensor 520 is either wirelessly connected to or hardwired to the control panel 300.

As illustrated in FIG. 5, in some embodiments of the invention, the single point devices 500 include a space CO2/humidity sensor 530 configured to inform the central monitoring and control system 900, in real-time, of any changes in air quality within the facility 6 that might be a cause for concern for people at the facility and/or that might cause damage to the facility 6 or systems contained therein. In one embodiment of the invention, the space CO2/humidity sensor 530 is a sensor that measures both CO2 and humidity together. However, in other embodiments of the invention, the humidity sensor and CO2 sensor are separate sensors. In one embodiment, the space CO2/humidity sensor 530 is located in the most common area of the facility 6 to provide the most-accurate average conditions for the entire facility 6. The space CO2/humidity sensor 530, as with the other single point devices 500, is either wirelessly connected or hardwired to the control panel 300. Typically, the space CO2/humidity sensor 530 is used as an alarm system in that it will provide the IC3 4 with an alarm if the humidity or CO2 readings are too high for the limits set by the IC3 4.

In one embodiment, the humidity is tracked in order to detect if there is a potential problem with the HVAC system, a broken window, an open door, and/or the like. In some embodiments of the invention, the humidity sensor can determine such problems as water entering a facility 6 after a storm, a water pipe braking, favorable conditions for mold growth, conditions that are too dry and may be uncomfortable to customers, etc. In some cases, the central monitoring and control system 900, automatically or upon the instruction of IC3 operators 12, will run the air conditioning units at the facility 6 in order to help lower the humidity and/or dry out any residual water in the facility 6. The humidity sensor can then also be used to inform the central monitoring and control system 900 when the facility 6 has been dried-out sufficiently and the air conditioning can be turned off or otherwise turned back to its normal routine.

In some embodiments of the invention, the humidity sensor may be used to control the humidity in facilities that have humidifiers/dehumidifiers or a damper on the HVAC system. In these cases, the central monitoring and control system 900 may be able to control the humidity remotely, to an extent, by altering the damper position in the HVAC system or by controlling the humidifiers/dehumidifiers at the facility. The humidity sensor and the data gathered therefrom and stored in the central monitoring and control system 900 can also be used for planning purposes. For example, if the data indicates a humidity problem in a facility 6 over time, then the IC3 4 may determine that a humidifier/dehumidifier should be installed in that area.

The CO2 sensor portion of the space CO2/humidity sensor 530 will be used by the central monitoring and control system 900 to determine if CO2 levels are too high and everyone at the location should be evacuated. The CO2 system also helps IC3 4 determine when to use inside air versus outside air for heating and/or cooling. Re-cooling or re-heating the inside air is, typically, significantly less expensive than using outside air for cooling because the inside air, in most cases, is much closer to the desired temperature than the outside air. Therefore, not as much energy is expended in getting the HVAC discharge air to the desired temperature. Therefore, if the CO2 levels are within a safe range, the inside air can be used for heating and cooling, which reduces the amount of energy used by the HVAC systems at the facility 6. However, when the CO2 levels inside of the facility 6 are outside of the desired range, the central monitoring and control system 900 instructs the HVAC systems through the control panel 300 to use the outside air until the central monitoring and control system 900 determines that CO2 levels return to the desired range at which time the central monitoring and control system 900 instructs the HVAC systems through the control panel 300 to use the inside air again.

As further illustrated in FIG. 5, the single point devices 500 can include one or more space temperature sensors 540. In one embodiment of the invention, the space temperature sensors 540 replace all existing thermostat controls in the facility 6. In general, the difference between the space temperature sensors 540 of the present invention and the typical thermostats are that the space temperature sensors 540 are network capable, while the control intelligence of the conventional thermostats are local. The space temperature sensors 540 are installed so that they can communicate via LAN 250 with the control panel 300 and, thereby, be controlled by the central monitoring and control system 900. In this way, the IC3 4 can have control over the temperature settings in each remote facility of the organization. The space temperature sensors 540, as with the other single point devices 500, are either wirelessly connected to or hardwired to the control panel 300.

In one embodiment of the invention, there are two different types of space temperature sensors 540 used in the facility maintenance and management system 1: "control temperature sensors" and "reading temperature sensors." The control temperature sensors include thermocouples or other temperature sensors for measuring temperature and relaying the temperature measurement to the control panel 300. However, the control temperature sensors also include user interface devices (e.g., a display and one or more dials or buttons) that allow employees or others at the facility 6 to change the temperature of the environment a number of degrees in either direction from the current/desired temperature value. In one embodiment, the desired temperature value and the extent that this value can be changed using a control temperature sensor are both set by the IC3 4. In other embodiments of the invention, however, there is not limit to how much a person at the facility 6 can change the temperature setting using a control temperature sensor. In still other embodiments of the invention, the IC3 4 may prevent the persons at the facility 6 from changing the temperature at all. In some embodiments, the control temperature sensors allow persons at the facility 6 to override the temperature control for only a specific amount of time and/or only during certain periods of time, such as, for example, during pre-defined facility "off-hours."

The second type of space temperature sensor 540 used in some embodiments of the invention is a reading temperature sensor, such as a thermocouple in communication with the control panel 300 that only provides the central monitoring and control system 900 with a temperature reading in a particular location and does not have a user interface for providing persons at the facility 6 with a mechanism for adjusting the temperature. The reading temperature sensors are used in areas in which the temperature is not controllable, where it is desirable only to measure temperature, and/or in areas that utilize separate mini heating/cooling units that are not tied into the facility maintenance and management system 1. For example, equipment rooms in some cases have individual mini-HVAC units because sensitive equipment in the rooms needs to be kept at a particular temperature that is not the same as the rest of the facility. In some cases, it can be expensive to tie-in each of these individual systems into the overall facility maintenance and management system 1. Therefore, in some embodiments, the IC3 4 will choose to only monitor (and not control) the temperature in such areas. Monitoring temperatures in those areas can still be important since a failure in the HVAC system could cause damage to the electrical components stored in that area. Quickly identifying temperatures of specific locations within the facility 6 allows IC3 4 to contact the facility 6 and any proper maintenance people to fix any issues before any damage occurs.

As further illustrated in FIG. 5, in some embodiments of the invention, a facility power meter 550, such as a facility current sensor is installed on the electrical meter at the facility 6. The facility power meter 550 is used to determine the amount of energy consumed by the entire facility 6. The facility power meter 550, as with the other single point devices 500, is either wirelessly connected to or hardwired to the control panel 300. As explained further hereinbelow, the HVAC monitoring and control system 600 (and/or other systems) can also have current sensors or other power meters. As such, when combined with the HVAC current sensors (and/or other current sensors/power meters), the facility power meter 550 may be used by the central monitoring and control system 900 to determine the amount of energy consumed by the facility 6 in general as well as the amount of energy consumed by the facility 6 apart from the HVAC system and other large power-draws. This can be done by taking the power measured by the facility power meter 550 and subtracting out the power measured by the HVAC system's power meter to determine the power used by the non-HVAC electrical systems at the facility 6, which, in one embodiment, includes the lighting systems and anything connected to an electrical outlet. The power loads consumed by both the HVAC systems and the facility 6 in general are used by the central monitoring and control system 900 to help control and reduce overall energy costs at the facilities by identifying inefficiencies and problems in any of the electrical systems.

In one embodiment, when monitoring energy output, the central monitoring and control system 900 first validates the energy readings to determine if there are any issues with any of the energy readings taken from each facility since the heating and cooling load can often be about 30% of the total building load. For example, if a HVAC system is only running at 5% and the facility is running at normal volumes, the central monitoring and control system 900 will determine that there is most likely an issue with the HVAC system. Conversely if the HVAC system is running at typical energy readouts and the facility power meter 550 is outside of the normal power readings, then the central monitoring and control system 900 will determine that there may be an issue with the facility's other electrical system and/or the power meter 550.

In some embodiments of the invention, the single point devices 500 used at the remote facilities will include motion detectors 560 and/or outside photocells 570. Both the motion detectors 560 and the outside photocells 570 can be hardwired to or wirelessly connected to the control panel 300. In some embodiments of the invention, the motion detectors 560 can replace people counters 510 to accomplish some monitoring tasks when the people counters 510 cannot be used. In some embodiments, the motion detectors 560 are used by the central monitoring and control system 900 to activate one or more lighting zones. The time limits associated with the motion detectors 560 and the times of day when they are operational can be controlled by the central monitoring and control system 900.

In some embodiments of the invention, one or more outside photocells 570 are used to determine sunrise and sunset (and/or the intensity of the sunlight and/or other ambient light) at one or more of the facilities. This data can be used to control the lighting zones as well as the HVAC system and/or other systems. For example, the photocell 570 could provide the central monitoring and control system 900 with data indicating that it is currently cloudy or sunny at a particular remote facility, which may prompt the central monitoring and control system 900 to adjust the lighting and/or the target temperature for the HVAC system at the facility. In some embodiments, in addition to or instead of photocells, the central monitoring and control system 900 determines sunrise and sunset, or the position of the sun generally, based on the longitude and latitude of each facility, the date, and known algorithms. In some embodiments, other sensors are used in addition to or as an alternative to photocells for sensing whether, such as outside humidity sensors, barometers, wind speed detectors, precipitation sensors and gauges, and/or the like. Such sensors can also be tied into the control panel 300 so that information gathered by these sensors can be gathered, analyzed, stored, and/or used by the central monitoring and control system 900 and/or the IC3 operators 12 to automatically adjust one or more systems at the remote facilities, identify or anticipate problems or issues, increase energy efficiency, reconstruct past events, and/or establish and control energy policy across the organization generally.

FIG. 6 provides a block diagram illustrating a HVAC monitoring and control system 600, in accordance with an embodiment of the present invention. As illustrated in FIG. 6, in one embodiment, the HVAC monitoring and control system 600 includes at least one of the following components: (1) a controller 610; (2) a radio modem 620 or other communication bus 630; (3) a whole unit current sensor 640 or a blower unit current sensor 650 and a condenser unit current sensor 655; (4) a discharge temperature sensor 660; (5) an AC step-down transformer 670; and (6) a DC power supply 680. The components used in various embodiments of the invention are typically determined based on the type of HVAC unit(s) used at the facility 6. The two types of HVAC units that may typically exist at the remote facilities are packaged systems and split systems. The packaged systems are single system units that are located together, typically on the roof of a facility. In general, a whole unit current sensor 640 is used with packaged HVAC systems. In one embodiment, the whole unit current sensor 640 is installed on the high leg of the HVAC unit using an amp meter. The whole unit current sensor 640 is used to determine the amount of energy load being used by the HVAC unit, which can then be compared, as previously discussed to the facility power meter sensor 550 to get an idea of how the HVAC unit is performing.

Conversely, split HVAC systems have a condenser unit that is located away from the blower. For example, in a split system, the coils and blower are usually located on the roof of the building and the condenser is located on the side of the building in or near the maintenance room. In these types of split systems two unit current sensors are needed to determine the energy usage of the entire split HVAC system. Therefore, a blower unit current sensor 650 is attached to the blower and a condenser unit current sensor 655 is attached to the condenser unit. The combination of these two sensors provides the central monitoring and control system 900 the information needed to determine the total HVAC load for a facility using a split system.

The rest of the components are generally the same for either the packaged system or the split system. As illustrated in FIG. 6, both systems will have a controller 610. The controller 610 is a standalone controller that communicates back to the control panel 300. In one embodiment, the type of controller may be dependent on whether the system is a straight A/C unit or an A/C unit that utilizes a pump. Regardless of the type of controller 610 used, the central monitoring and control system 900 has the ability to control, through the control panel 300 which is linked to the controller 610 via the LAN 250, the on/off control of the HVAC system, the temperature regulating controls, and, in some cases, the damper, vents, blower, and/or the like. Furthermore, the controller 610 also sends diagnostic information back to the control panel 300 which communicates some or all of this data to the central monitoring and control system 900 where it is used in analyzing the performance of the HVAC system.

The controller 610 is linked over the LAN 250 to the control panel 300 in one of two ways. If a controller 610 uses a wireless connection, a radio modem 620, or other wireless transceiver is used to make the connection. Alternatively, if the controller 610 is hardwired to the control panel 300, a wire or other wired communication bus 630 is used to allow the controller 610 to communicate with the control panel 300.

The discharge temperature sensor 660 is located at the HVAC system's discharge air vent before it is split off into the various ducts. This sensor 660 monitors the temperature of the discharged air coming from the HVAC system and uses, in one embodiment, a wireless connection to send the temperature data to the control panel 300 where it is eventually sent to the central monitoring and control system 900. The central monitoring and control system 900 and/or the IC3 operators 12 then compare the discharge temperature sensor 660 data with the temperature set at the controller 610 and with data from the outside air temperature sensors 520 and/or inside space temperature sensors 540 to determine if the HVAC system is functioning properly. In some embodiments of the invention, if the system is not working properly, an alarm will be initiated at the central monitoring and control system 900 indicating that there is an issue. As will be discussed in more detail hereinbelow, in some embodiments of the invention, the IC3 4 will attempt to analyze the data and diagnose and/or resolve the problem before sending a technician out to fix the problem. For example, an increase in the discharge air temperature over a period of time relative to the target temperature could indicate something as simple as a filter needing replacement, or the discharge temperature being the same as the outside temperature could indicate that the HVAC system is not working.

In the illustrated embodiment of the invention, the HVAC monitoring and control system 600 also has an AC stepdown transformer 670 and a DC power supply 680. The AC stepdown transformer 670 powers-up the components and controls used to run the HVAC systems and its components. The DC power supply 680 provides the necessary power supply to run the HVAC system and is tied to the HVAC monitoring and control system 600 to supply any power needed for any of its components.

Although not illustrated in FIG. 6, in some embodiments of the invention, other sensors are used to monitor other aspects of the HVAC system. For example, in one embodiment, the HVAC monitoring and control system 600 includes one or more airflow sensors, such as one or more pressure transducers, configured to monitor pressure and/or airflow at various places in the HVAC system. For example, in one embodiment of the invention, airflow sensors are placed on either side of each filter in the HVAC system and the central monitoring and control system 900 uses the data to determine if a filter is clogged and needs replacement or if the blower is malfunctioning.

In some embodiments of the invention, if a facility is large enough, a boiler system and/or chiller system may be used in addition to or as an alternative to the HVAC system. In this regard, FIG. 7 provides a block diagram illustrating a boiler monitoring and control system 700, in accordance with an embodiment of the present invention. FIG. 8 provides a block diagram illustrating a chiller monitoring and control system 800, in accordance with an embodiment of the present invention. A boiler system is used for steam or water heating and a chiller system is used for water-cooled air conditioning systems. The chiller system is used in a split system in larger applications where cooled water is distributed to various units throughout the building instead of the condensers used in smaller HVAC applications. In some embodiments of the invention, the boiler and chiller monitoring and control systems 700 and 800, respectively, would each have an independent controller 710 and 810 similar to the HVAC controller 610 and coupled to the control panel 300 via a wireless modem 720/820 or wired communication bus 730/830 so that the IC3 4 could control the on/off controls of these systems. If pumps are used in the boiler system and chiller system, other relays could be added to provide IC3 4 with control over the pumps. In some embodiments, these systems also have whole unit current sensors 740 and 840 or current sensors for each component thereof. In some embodiments, both the boiler and chiller systems utilize temperature sensors 760 and 860 and, in some cases, water flow sensors 770 and 870, to determine whether the boiler and chiller systems are working properly.

FIG. 9 provides a block diagram illustrating a central monitoring and control system 900, in accordance with an embodiment of the present invention. As illustrated in FIG. 9, the central monitoring and control system 900 generally includes a WAN communication interface 910, a processing device 920, a user interface 930, and a memory device 950. The processing device 920 is operatively coupled to the WAN communication interface 910, the user interface 930, and the memory device 950. In one embodiment of the central monitoring and control system 900, the memory device 950 includes a central monitoring and control application 955 having computer-executable program code that instructs the processing device 920 to operate the WAN communication interface 910 and the user interface 930 to perform certain communication functions of the central monitoring and control system 900 described herein. The computer-executable program code of the central monitoring and control application 955 may also instruct the processing device 920 to perform certain logic, data processing, and data storing functions of the central monitoring and control system 900 described herein.

The WAN communication interface 910 is a communication interface having one or more communication devices configured to communicate with one or more other devices on the WAN 2, including the control panel 300 of each local monitoring and control system 200 at each remote facility. The processing device 920 is configured to use the communication interface 910 to receive information from and provide information and commands to a control panel 300 at each remote facility via the WAN 2. In some embodiments, the processing device 920 also uses the WAN communication interface 910 to access other devices on the WAN 2, such as one or more web servers. In some embodiments, one or more web servers may be used to obtain information from third parties that may be useful for assessing and controlling the performance of facility systems, such as weather information at each facility from one or more weather service providers, sunrise and sunset information for each facility, contractor information for local contractors near each facility, and/or the like.

As described above, the processing device 920 is configured to use the WAN communication interface 910 to gather data from the various local monitoring and control systems 200. The processing device 920 stores the data that it receives in the memory device 950. In this regard, in one embodiment of the invention, for each remote facility having a local monitoring and control system 200, the memory device 950 includes datastores of, for example: (1) lighting system status and power data 960; (2) single point device data 962; (3) HVAC/boiler/chiller power, temperature, and/or flow data 964; (4) weather data 966; (5) facility floorplans 968; (6) facility operator information 970; (7) facility contractor and/or utility information 972; and/or (8) schedule data and/or other facility-specific control rules 974.

The lighting system status and power data 960 may include data about whether one or more of the lighting systems in the facility are on or off, the power drawn by the one or more different lighting systems or other power-related data such as electrical resistance data, when any automatic lighting schedules are overridden by someone in the facility, and/or the like. The single point device data 962 may include data from any number of the single point devices described hereinabove, such as, for example, facility occupancy data. The HVAC, blower, and chiller data 964 may include, for example, temperature data and/or flow data taken from different locations within or outside of these systems, power data or power-related data for each unit or component thereof, system status data (e.g., on/off), system override data, and/or the like. The weather data 966 may include information about the weather received from the local monitoring and control systems 200 or deduced from such data, or, in some embodiments, includes information about the facility's weather received from some other source, such as from a third-party web server.

The facility floorplans 968 include floorplans for the facility that, in one embodiment, have, marked thereon, the location of the facility's power-using systems 22 and the components of the local monitoring and control system 200. In one embodiment, the floorplan 968 for a particular facility can be pulled up and displayed on the user interface 930 so that an IC3 operator 12 dealing with an issue regarding the facility can view the local monitoring and control system 200 in relation to the facility and the facility's power-using systems 22. In this way, if the IC3 operator 12 is in communication with a facility operator 24, a contractor, or other person at the facility, the IC3 operator 12 can direct the person to the source of the issue and to any other system components that the person needs to access.

Other information about the facility may also be available, such as facility operator information 970 which may include the name, contact information, and job responsibility and/or skills of different people located at or otherwise associated with the facility. This information will provide IC3 operators 12 with an idea of who may be the proper person to call at the facility if an issue arises at the facility requiring attention on the ground at the facility. Similarly, the memory 950 may also include, for each facility, the name and contact information of one or more contractors in the area local to the facility and/or the name and contact information for the utility companies that service the facility.

As further illustrated in FIG. 9, in some embodiments of the invention, the central monitoring and control system 900 includes a user interface 930. In general, the user interface 930 includes one or more display devices, keyboards, touch screens, buzzers, lights, LEDs, speakers, microphones, and/or other user input and output devices that are used by the central monitoring and control system 900 to display data to and receive commands from the IC3 operators 12. In this regard, the central monitoring and control system application 955 includes computer executable program code for generating and displaying, via the user interface 930, a graphical user interface that displays information received from the remote facilities to the IC3 operators 12 in an interactive way and allows the IC3 operators 12 the ability to send commands to the remote facilities, create system schedules for each remote facility, and view information about each facility and the facility's power-using systems.

For example, in one embodiment, the user interface 930 includes a plurality of workstations for a plurality of IC3 operators 12, each workstation including a monitor, keyboard, mouse, and headset with microphone and speaker. In one embodiment, the user interface 930 further includes several large display screens that are used to display high-level system-wide information to the IC3 operators 12 and/or that an IC3 operator 12 can use to display what is on his or her workstation monitor to the rest of the IC3 operators 12. FIGS. 11-18, described in greater detail hereinbelow, provide examples of a graphical user interface generated by the central monitoring and control system 900 in accordance with an embodiment of the present invention.

FIGS. 10A, 10B, and 10C provide a flow chart 1000 illustrating processes performed by the facility maintenance and management system 1, in accordance with an embodiment of the present invention. As illustrated in blocks 1002, 1004, and 1006, respectively, the lighting monitoring and control system 400, single point devices 500, and/or HVAC/blower/chiller monitoring and control systems 600/700/800 each generate data pertaining to the systems, such as energy-use data (e.g., current, resistance, power, etc.), status data (e.g., on/off), temperature data, flow data, occupancy data, and/or any other data described hereinabove. As illustrated by block 1008, the control panel 300 installed at the facility receives this data from the various monitoring and control systems and single point devices installed at the facility.

As illustrated by block 1010, the control panel 300 then performs any data processing that it may do on certain data prior to communicating the data to the central monitoring and control system 900. For example, in some embodiments of the invention the control panel 300 buckets certain data, as described hereinabove, so as to reduce the amount of data communicated to the central monitoring and control system 900. In other embodiments, processing may include compressing, encrypting, or otherwise modifying the data for transmission. In still other embodiments, the control panel 300 may combine data (e.g., add up power use data for a plurality of components of a particular system so as to provide the central monitoring and control system 900 with total power use data from the system as a whole, or subtract facility power use by HVAC power use to provide non-HVAC facility power use, etc.) or otherwise manipulate or selectively send data to the central monitoring and control system 900. In still other embodiments, the control panel 300 merely relays data to the central monitoring and control system 900 without any processing of the data.

As illustrated by block 1012, the control panel 300 sends the processed data to the central monitoring and control system 900 via, for example, the Internet or other WAN 2. As represented by block 1014, the central monitoring and control system 900 receives this data from the control panel 300 as well as data from numerous other control panels associated with numerous other remote facilities. As represented by block 1016, the central monitoring and control system 900 then stores the data for each facility in its memory device 950.

As represented by block 1018, in one embodiment of the invention, the central monitoring and control system 900 uses known algorithms to calculate sunrise and sunset, and/or other sun positions, for each facility using each facility's latitude and longitude and the date. Such sun position information is also stored in the memory device 950 and associated therein with the appropriate facility.

As represented by block 1020, in one embodiment of the invention, the central monitoring and control system (C.M.C.S.) 900 generates a graphical user interface that presents data about the remote facilities to IC3 operators 12. For example, FIGS. 11-18, described in greater detail hereinbelow, illustrate examples of the graphical user interface in accordance with one embodiment of the invention. The graphical user interface is presented to the IC3 operators 12 using the C.M.C.S.'s user interface 950.

As represented by block 1022, the IC3 operators 12 use the graphical user interface to monitor the data received from each facility. In some embodiments of the invention, the IC3 operators 12 try to identify ways to save energy or improve performance of systems at the remote facilities. In this regard, in some embodiments, the IC3 operators 12 create schedules or rules for turning off and on various lighting zones at each remote facility, for turning off and on or otherwise adjusting the temperature or dampers of the HVAC system at each remote facility, and/or the like. These "commands" may be created by the IC3 operators 12 and stored in the schedule data and other control rules 974 area of the memory device 950. Based on these commands, the C.M.C.S. 900, at appropriate times, issues commands over the WAN 2 to the appropriate control panels 300 to instruct the control panel 300 to turn off/on or otherwise adjust the lighting, HVAC, or other system at the remote facility, as the case may be.

In some embodiments, the IC3 operators 12 try to identify and respond to problems or potential problems at each of the remote facilities. For example, an IC3 operator 12 may notice that the power used by the HVAC system at a remote facility has suddenly changed and that the facility is not staying at a constant temperature as well as it has in the past. The IC3 operator 12 may conclude that there may be something wrong with the HVAC system at that facility and may call or otherwise contact one or more facility operators 24. In one embodiment, the IC3 operator 12 obtains the contact information, e.g., name, title, phone number, email address, job responsibility, and/or the like, for the facility operators 24 associated with the appropriate facility via the C.M.C.S.'s facility operator info datastore 970. In one embodiment, the IC3 operator 12 can also use the C.M.C.S.'s facility floorplan datastore 968 to be able to instruct the facility operator 24 over the phone where to go to check various systems at the facility.

In some embodiments, the facility operators 24 or others at the facility (e.g., customers or employees) contact the IC3 4 about a problem, complaint, potential problem, or other issue and the IC3 operator 12 pulls up information about the relevant facility and works to identify and/or fix the problem.

As illustrated by block 1026, in some instances, the IC3 operators 12 cannot fix the problem themselves or with facility operators 24. In such instances, the IC3 operators 12 may contact third-party contractors and request that they go to the facility and fix the problem. In one embodiment, the IC3 operator 12 or the C.M.C.S. 900 generates a work order automatically which is sent to the contractor and the facility operators 24 so that each party is aware of where and when the third-party contractor will be showing up and which problem is to be fixed by the third-party contractor. In one embodiment, the IC3 operator 12 obtains the contact information, e.g., name, title, company name, address, phone number, email address, job responsibility, and/or the like, for appropriate third-party contractors associated with the relevant facility via the C.M.C.S.'s facility contractor/utility datastore 972.

As illustrated by block 1032, in some embodiments of the invention, the C.M.C.S. 900 automatically identifies potential problems at each facility based on the facility's power data, temperature data, occupancy data, $CO_2$ data, humidity data, flow data, and/or other data received from the facility's control panel 300. As represented by block 1034, in some cases, the C.M.C.S. 900 automatically generates alerts, which may be in the form of a highlighted item in the graphical user interface, a sound, a pop-up window on the display of the user interface, an email or text message to an IC3 operator 12, and/or the like. In other embodiments, the C.M.C.S. 900 automatically issues commands to the control panel 300 in an attempt to verify or resolve the problem or notify facility operators 24 of the problem, as represented by block 1030. For example, in one embodiment of the invention, the current sensed for the exterior lighting zone at a certain facility suddenly drops some predefined amount and the C.M.C.S. 900 automatically identifies this as most likely a pole light burning out. In one embodiment, the C.M.C.S. 900 automatically sends a message to a particular facility operator 24 at the facility instructing the facility operator to check for and replace any burnt-out exterior light bulbs. If the C.M.C.S. 900 does not see the current return to normal after some predefined period of time (e.g., two days), then the C.M.C.S. 900 may generate an alert to an IC3 operator 12 notifying the operator 12 of the issue and requesting that the IC3 operator 12 follow up with the facility operator 24 by phone.

As illustrated by block 1040, in some embodiments of the invention, the C.M.C.S. 900 automatically generates HVAC/chiller/boiler system schedules and setpoints at each facility based on, for example, occupancy data, temperature data, facility hours, calculated sun position, photocell data, weather data, facility type, facility location, and/or one or more predetermined control rules 974 for each facility. Based on these schedules, the C.M.C.S. 900 then generates and issues commands to the control panel 300 at the appropriate times in order to control each facility's system in accordance with the schedules and predetermined control rules, as represented by block 1030.

As illustrated by block 1050, in some embodiments of the invention, the C.M.C.S. 900 automatically generates lighting schedules at each facility based on, for example, occupancy data, facility hours, calculated sun position, photocell data, weather data, facility type, facility location, and/or one or more predetermined control rules 974 for each facility. Based on these schedules, the C.M.C.S. 900 then generates and issues commands to the control panel 300 at the appropriate times in order to control each facility's system in accordance with the schedules and predetermined control rules, as represented by block 1030.

As represented by block 1060, the control panel 300 at each facility receives the commands from the C.M.C.S. 900 and issues commands to the appropriate controllers of the various facility systems and/or to the facility operators 24, depending on whether the relevant system can be controlled automatically or requires facility operator 24 action. As represented by blocks 1062, 1064, 1066, and 1068, respectively, the facility operators 24, lighting monitoring and control system 400, single point devices 500, and/or HVAC/boiler/chiller monitoring and control systems 600/700/800 then execute the commands issued from the control panel 300.

Central Monitoring and Control System Graphical User Interface

FIGS. 11-18 provide examples of a graphical user interface generated by the central monitoring and control system 900 in accordance with an embodiment of the present invention. As illustrated in FIG. 11, the graphical user interface 1100 includes a header having the date and time 1111 of the last data update received from the particular facility being viewed, which, in one embodiment, is approximately equal to the current date and time since the control panel 300 of each facility communicates real time or near real time data to the central monitoring and control center 900. The header also includes the current building mode 1112 of the facility, which here is shown as being in "customer" mode indicating that the facility is one in which customers may be visiting and that it is currently during hours when customers may be visiting. This mode may affect the settings for lighting, HVAC, security, and/or other systems at the facility. Other possible modes may be, for example but not limited to, "employee-only" and "after-hours." The header also includes the name and address 1113 of the facility being viewed, the outside air temperature at the facility 1114 as determined by an outside temperature sensor at the facility, and the building humidity 1115 as determined by a humidity sensor at the facility.

On the left side of the graphical user interface, the name or code 1110 for the facility is shown followed by a drop-down list of links to information about the facility. These links include, but are not limited to, a "building" link 1120, a "floorplans" link 1130, a "HVAC systems" link 1140, an "electrical systems" link 1150, and a "data and alarms" link 1160. Clicking on each of these links will bring up other options and other graphical views showing different information about the facility.

For example, as illustrated in FIG. 11, clicking on the building link 1120 pulls up a building summary view 1160 that summarizes some important information about the facility. For example, in one embodiment, the building summary includes a power consumption summary 1161, a building health summary 1166, a lighting summary 1169, and an air handling units summary 1180.

In one embodiment, the power consumption summary 1161 includes the power demanded (e.g., in kW) over the past thirty minutes 1162, the average hourly energy usage (in kW-hr) 1163, and the average daily energy usage (in kW-hr) 1164. At various places in the graphical user interface, a graph symbol 1165 is displayed next to a particular metric and can be clicked on to display a graph showing the history of values for the particular metric. For example, clicking on the graph symbol 1165 will show a graph illustrating the history of Thirty-Minute Power Demand values over some period of time. In one embodiment, the building health summary 1166 includes the humidity 1167 and the $CO_2$ 1168 of the interior space. In one embodiment, the lighting summary 1169 shows each of the lighting zones at the facility. In the illustrated example, there are three lighting zones at the facility: an interior lighting zone 1170, exterior lighting zone 1171, and a signage lighting zone 1172. For each lighting zone, the current command (e.g., on/off as set forth by the central monitoring and control system 900) and the current actual status (e.g., on/off) are shown for each. If the command does not match the status, this may indicate a problem with the lighting system or lighting system's monitoring and control system. In one embodiment, the air handling units summary 1180 includes, for each unit, the name/code 1181 of the unit, the current status 1182 of the unit, the current mode 1183 of the unit, the current temperature 1184 in the space heated/cooled by the unit, a history 1185 of the space temperature for the unit, the setpoint 1186 for the unit (e.g., the temperature commanded by the thermostat and/or the central monitoring and control system 900), and the supply temperature 1187 (i.e., the temperature of the air input into the air handling system).

In one embodiment of the user interface, a user can click on each summary or unit name to pull up more detail about the particular summary or unit. For example, clicking on a unit name 1181 for an air handling unit may, in one embodiment, bring up a view of the unit, such as, for example, the view illustrated in FIG. 14. Furthermore, in some embodiments of the invention, the values are colored or otherwise highlighted so as to indicate unexpected values to which the user's attention should be drawn. For example, where the current space temperature is some predefined number of degrees or percentage points from the setpoint temperature, the graphical user interface may show the value in a different color than the other values to draw attention to this discrepancy. Rules for generating these types of alerts are either predefined or set by the user by going to the data and alarms link 1160 and creating/modifying the alert rules using the user interface.

In one embodiment, the building summary view 1160 also includes a link 1190 to a floorplan view for the facility, such as the floorplan view illustrated in FIG. 13.

Referring now to FIG. 12, FIG. 12 illustrates a facility occupancy/traffic view 1210 for the facility, which, in one embodiment, can be accessed by clicking on the "people counter" link 1200 in a menu expandable under the building link 1120. The occupancy/traffic view 1210 includes a summary of the traffic through the facility, as identified by the people counters at the entrances and exits to the facility, and the current occupancy of the facility. For example, the occupancy/traffic view 1210 shows, in one embodiment, a summary 1220 of the persons entering the facility. This summary 1220 includes the number of persons that entered in the current hour 1222, in the last hour 1224, and so far in the current day 1226. The occupancy/traffic view 1210 also shows, in one embodiment, a summary 1230 of the persons exiting the facility. This summary 1230 includes the number of persons that exited in the current hour 1232, in the last hour 1234, and so far in the current day 1236. The occupancy/traffic view 1210 also includes the current occupancy 1240 of the facility, which, in one embodiment, is obtained by subtracting the number of people exiting the facility from the number of people entering the facility.

In one embodiment, the traffic/occupancy view 1210 also includes an illustration of people counting sensors to help the user quickly identify the type of information being displayed by the graphical user interface.

Referring now to FIG. 13, FIG. 13 illustrates a floorplan view 1320 of the graphical user interface. In one embodiment, this view is accessed by clicking on the "floorplans" link 1300 in a drop-down menu on the left side of the interface and then clicking on a particular floor, or by clicking on a floorplan link in other views, such as the floor plan link 1190 in FIG. 11 or the floorplan link 1490 in FIG. 14.

As illustrated in FIG. 13, in one embodiment of the invention, the floorplan view 1320 includes a floorplan 1330 for the selected floor or other portion of the facility. In addition to the typical floorplan illustrations (e.g., walls, doors, windows, etc.), the floorplan shows the location of energy-using systems (e.g., HVAC units, etc.) and components of the local monitoring and control system 200 (e.g., thermostats, lighting system relays, humidity sensors, people counters, etc.). In one embodiment, the graphical user interface includes a key 1340 explaining what the symbols in the floorplan indicate.

For example, in the illustrated example, the floorplan 1330 shows the several HVAC units 1342 charged with heating/cooling portions of the floorplan 1330 and a thermostat associated with each HVAC unit located in the space being heated/cooled by the HVAC unit. The floorplan 1330 also includes an HVAC controls interface 1344, lighting control relays 1346, an electrical power kWh meter 1348, a space temperature sensor 1370, a space humidity sensor 1372, a space CO2 sensor 1374, and a people counter 1362 at the front door 1360. The floorplan also indicates values for each thermostat as well as the space humidity value 1350 and space CO2 value 1355. In one embodiment, clicking on one of the energy-using units 1342 shown in the floorplan 1330 will take the user to a view of the energy-using unit, such as the view illustrated in FIG. 14.

FIG. 14 illustrates a detailed view of an HVAC unit and the workings thereof which, in one embodiment, can be accessed by clicking on the HVAC systems link 1400 on the left side of the graphical user interface and then clicking on a link 1410 for a particular HVAC unit. The user may also be able to access this view by clicking on the identifier for the HVAC unit shown in any other view of the graphical user interface. As illustrated in FIG. 14, the HVAC unit view includes the name or other unit identifier 1420, the location of the unit 1422, the commanded mode 1424, whether the command has been satisfied by the unit 1425, and the current (e.g., in Amps) 1428 currently being measured by the whole unit current sensor for the HVAC unit. In one embodiment, the HVAC unit includes several alarm indicators 1430 that indicate (by, for example, changing from greed to red) when the unit is not cooling or heating sufficiently. For example, in one embodiment, progressively more serious alarms may be issued through the graphical user interface as the difference between a commanded temperature and the actual temperature at the thermostat passes certain predefined thresholds.

The HVAC unit view also includes an illustration 1440 of the particular HVAC unit showing various components thereof and various metric values sensed by the HVAC monitoring and control system 500. For example, the HVAC unit view may show: (1) the status 1442 of the dampers controlling how much outside air is supplied to the HVAC unit (2) the current status and history of fan operation 1444 (3) the current status of the cooling unit or heating unit 1446; (4) the supply air temperature and history 1448; and (5) the status of the controller 1450. Current temperature status 1460 and temperature setpoints 1470 for each mode (e.g., "heating customer" mode, "cooling customer" mode, "heating associate-only" mode, "cooling associate-only" mode, "heating after-hours" mode, and "cooling after-hours" mode). In one embodiment, the IC3 operators 12 can click on these setpoints in this view and in other views to change the setpoints. Likewise, in some embodiments, the IC3 operators 12 can click on the "status" or "command" indicators in each view to change the current status or command.

FIG. 15 illustrates a view of a boiler system 1510, which, in one embodiment, may be accessed by clicking on the "Hot Water System" link 1500 in the HVAC sub-menu on the left side of the graphical user interface. As illustrated in FIG. 15, in one embodiment, the boiler view 1510 includes an illustration of the boiler 1520, a boiler status indicator 1522, the status of each of three hot water pumps drawing water from this boiler 1424, 1526, and 1528, and indications of where (e.g., which radiators) each of the three pumps deliver the hot water to 1525, 1527, and 1579. Also shown is the boiler supply temperature and history 1550, the setpoints 1530 and 1540 for when the facility is occupied and unoccupied.

FIG. 16 illustrates a chiller view 1600 showing an illustration of the chiller, the status of the chiller and the current (in Amps) drawn by the chiller 1620, the status of each of two pumps drawing from the chiller 1630 and 1635, and the temperature of the water supplied to the chiller 1640. Information 1650 about the chiller is also displayed as are the current space temperatures and setpoints for the space cooled by the chiller 1660 and the temperature mode setpoints 1670 for different modes of operation.

FIG. 17 illustrates the electrical consumption view 1710 for the facility, which can, in one embodiment, be accessed by clicking on the electrical systems and power usage links 1700 on the left side of the graphical user interface. In the illustrated embodiment, the view includes current data for the last five minute power (kW) demand 1720, the last fifteen minute power (kW) demand 1730, the last thirty minute power (kW) demand 1740, the energy used (kWH) this hour 1750, the energy used (kWH) for the last hour 1760, the energy used (kWH) for the current day 1770, the energy used (kWH) for the previous day 1780, and the energy (kWH) per pulse. An illustration of an electricity meter is also provided to help the user quickly identify what the current graphical user interface is showing generally.

FIG. 18 provides an illustration of the lighting view 1810 of the graphical user interface, which, in one embodiment, can be accessed by clicking on the lighting link 1800 on the left side of the graphical user interface under the expanded "electrical systems" menu. As illustrated, the lighting view shows a summary for each of the, in this example, three lighting zones for the facility: the interior lighting zone 1820, the exterior lighting zone 1830, and the signage lighting zone 1840. These summaries show the current light command determined by the central monitoring and control system 900 as well as the current status of the lights. These summaries also show whether a schedule stored at the central monitoring and control system 900 for the particular lighting zone and facility is enabled or disabled. Also, in the illustrated example, in the case of the exterior lighting and the signage lighting zones, the summary shows whether the sun position calculation (or other algorithm used to control these lighting zones) is enabled or disabled. In one embodiment, the IC3 operator 12 can change the command and enable or disable the schedule or calculation.

FIG. 18 also shows how, in one embodiment of the graphical user interface, icons are displayed representing each lighting zone and are shaded, "grayed-out," or otherwise darkened to illustrate to the IC3 operator 12 that the lighting zone is currently off. For example, icon 1825 illustrates the interior lighting zone 1820 and shows that the lighting zone is currently turned on. Icons 1835 and 1845 illustrate the exterior lighting zone 1830 and signage lighting zone 1840, respectively, and both indicate that these lighting zones are currently turned off.

FIG. 18 also includes an exterior lighting control section 1850 where the IC3 operator can review and change variables used to calculate sunrise and sunset and change when the exterior lights are turned on and off. For example, in one embodiment, the exterior lighting control section 1850 includes the site latitude, site longitude, calculated sunrise time based on the latitude and longitude, sunrise offset (the length of time after the calculated sunrise time when the exterior lights should go off), and the sunset offset (the length of time after the calculated sunset time when the exterior lights should turn on—here "–30" indicating thirty min before the calculated sunset). The IC3 operator may be able to change the sunset and sunrise offsets or, in some embodiments, the latitude and longitude, and then click the recalculate button 1855 to recalculate the sunrise and sunset times and the lighting schedule. The next event time 1857 shows the next scheduled status change for the exterior lighting zone 1830.

FIG. 18 also shows how the lighting view 1810 includes, in one embodiment, the present current readings 1860 for the exterior lighting zone, including the actual current and current history, the baseline current, and the low alarm limit. As described hereinabove, the current of a lighting zone, particularly the exterior and signage lighting zones or any lighting zone that draws a fairly consistent current, can be used to indicate a burnt-out light bulb or other malfunction. In the illustrated example, the actual current of the exterior lighting zone 1830 is presently indicated as approximately zero amps since the lighting zone is currently turned off. However, the normal/average current for the exterior lighting zone when turned on is shown as thirty amps. In this example, if the current drawn by the exterior lighting zone 1830 drops below the low alarm limit of, in this example, twenty-four amps when the exterior lighting zone 1830 is turned on, then an alarm is initiated by the central monitoring and control system 900.

FIG. 18 also illustrates alarms 1870 for each of the lighting zones. These alarms may change from green to red if certain alarm conditions are satisfied, such as if the light command for a zone does not match the zone's status and/or if the current for a zone drops below or rises above a low or high alarm limit.

Installation of Local Monitoring and Control System and Site Survey Tool

Embodiments of the invention disclosed herein are also directed to a site survey tool, a streamlined installation process, and remote commissioning of the installation associated with the facility maintenance and management system 1 described hereinabove. As described herein above, the facility maintenance and management system 1 includes a central monitoring and control system 900 in communication with a local monitoring and control system 200 located at each of a plurality of remote facilities. FIG. 19 illustrates a flow chart of a method for site survey and installation of a local monitoring and control system 200 at a remote facility, in accordance with an embodiment of the invention. It will be understood that each block of the flowchart illustrations and/or block diagrams, and combinations of blocks in the flowchart illustrations and/or block diagrams, illustrate one or more functions/acts to implement a site survey, installation, and remote commissioning of the installation. The flow chart is divided into blocks illustrating actions or events that are undertaken by an employee/representative of a company (e.g., a financial institution), a third party (e.g., a contractor), and/or any other entity. It will be understood that, unless clearly stated herein otherwise, in other embodiments of the invention, the actions or events may be performed in a different order or simultaneously. Likewise, in some embodiments, one or more of the actions or events may be removed, optional, added, and/or combined with one or more other actions or events.

As illustrated by block 2002, one or more remote facilities are identified as a facility which will have a local monitoring and control system 200 installed and the facility is scheduled to be surveyed. Embodiments of the invention are generally described herein as the facility including a remote building of an organization, but it should be understood that the remote facility could be any other asset where energy-consumption may be remotely managed. For example, as previously mentioned, the location may be any energy-consuming assets of am organization (e.g., a bank), such as buildings (e.g., bank branches, office space, etc.), automated teller machines and buildings housing automated teller machines, electronic billboards, and/or any other remote property or location which has devices and systems that consume energy. Energy from each facility is remotely managed by a control center, e.g., the IC3 4 described hereinabove, or from any other location. It should be understood that energy, as referred to herein, includes not only electrical energy, but may also include other utilities (e.g., gas, water, etc.) and other aspects which are related to operational costs of a company.

As represented by block 2004 in FIG. 19, a notification is sent by the control center to one or more facilities on schedule to be surveyed prior to surveying. Such notification provides an indication to the facility that a survey team using a site survey tool will be gathering information about the building, including, for example, information about the building layout, entrances and exits, lighting system, HVAC system, signage, chillers, boilers, electronics, ATMs, and/or the like. This process is discussed in more depth hereinbelow with respect to block 2012.

As represented by block 2006, a survey team travels to the targeted facilities to create, for each facility, an engineering report and materials list as well as other information on the buildings and/or devices that operate at the facility. In some aspects, the survey team includes at least one employee or contractor that is trained to gather data from the facility using a site survey tool described in greater detail hereinbelow. In one embodiment, the team does not need to ever physically travel to the central control center or be an employee of the organization.

As represented by blocks 2008 and 2010, the survey team uses the site survey tool. The survey team logs into the site survey tool and/or indicates activation of a survey to the site survey tool, as illustrated in the first screenshot of FIG. 21A. Then, as represented by block 2008 of FIG. 19, the site survey tool is hooked up to, and automatically interrogates, a HVAC system at the facility to gather information about the HVAC system. The site survey tool is an electronic handheld device that, when electrically connected to the HVAC system, automatically communicates with the HVAC system and retrieves information regarding the performance of the HVAC system. The user can also input data around the HVAC system type. In one embodiment, such information includes, for example, the HVAC model and serial number, the age of the HVAC system, the history of energy consumption of the HVAC system, diagnostics of the HVAC system to determine if any maintenance, repairs or upgrades are needed, information regarding what will be needed to remotely control the HVAC system, and/or the like. In one embodiment, the diagnostics are automatically downloaded from the HVAC system when the handheld device is connected to the HVAC system, while the serial number, age, and other information are all manually entered into the handheld device. In other embodiments, all of the information is automatically downloaded or manually entered.

As represented by block 2010, various inquiries are presented to the site survey team. These inquiries relate to various aspects of the facility which will be remotely controlled, as well as operation of such facility. Examples of such inquiries are presented in FIGS. 21A-21R and include, for example, inquiries regarding the hours of operation of the building, what systems and devices consume energy, the layout of the building (e.g., how many entrances/exits are there, how many floors are there, what are the floor layouts, etc.), electrical panel information, and/or the like.

As represented by block 2012, the survey team gathers data on the facility and operation thereof and then inputs such data into the site survey tool in response to presentation of the inquiries from the site survey tool. In some embodiments, the survey team can input the data into the site survey tool without having the inquiries presented to the team first.

As an example to illustrate the processes represented by blocks 2010-2012, in one embodiment of the invention where the facility is a branch bank building, the site survey presents an inquiry asking "is the bank open on Saturdays?" and the site survey team checks a check box "Yes" or "No." As another example, the site survey presents an inquiry asking "what is the number of electrical meters (inside and out)" and the site survey team is allowed to enter a numerical value. As a further example, the site survey presents an inquiry asking "what is the brand of the main electrical panel" and the site survey team is allowed to select from a drop down list of possible brands (e.g., Siemens, Square D, GE, Federal Pacific, or "Other"). Other examples of inquires and inputs that may involved are illustrated in FIG. 21.

As represented by block 2014 in FIG. 19, determinations are made as to whether any more inquiries are to be presented by the site survey tool, and whether any more data will be inputted into the site survey tool. This may occur by the site survey tool reaching the completion of inquiries in a standard survey questionnaire. In another embodiment, the site survey team can press a button or transmit some other indication to indicate that the survey is completed for the site. For example, an "end" or "complete" button may be attached to the site survey tool to end the survey.

As represented by block 2016, after the site survey is completed, an engineering report and materials list is generated. In some embodiments, the engineering report and materials list includes at least one report that indicates all of the engineering details and materials required to build a local monitoring and control system 200 for the facility that will remotely connect to the central monitoring and control system 900 that will remotely monitor and manage systems and energy at the facility. In one embodiment of the invention, this materials list is auto-generated and printed out by the materials handling team that packs and ships the appropriate materials. In one embodiment, no other data is needed other than the engineering report and materials list to build the local monitoring and control system 200 for the particular facility surveyed. In some embodiments, however, an additional report may be generated that includes all the engineering and operational data of the facility, such as floor layouts, electrical connections, energy consuming devices, and the detailed parameters thereof, operating information (e.g., hours of operation, number of people that come in and out of the building, number of employees, special needs of the building, information about keys, etc.), location of the building, and the like. This report would supplement the engineering report and materials list.

As represented by block 2018, the central control center, such as the IC34 described hereinabove, learns that the facility is ready for installation of a local monitoring and control system 200. This notification may be made via e-mail message, text message, voice message, or any other alert. This alert may be sent via a wireless network as illustrated herein in FIG. 20.

As represented by block 2020, the site survey tool transmits information back to the control center to streamline installation of the local monitoring and control system 200. For example, the site survey tool may wirelessly transmit the engineering report and materials list to the control center along with any other report generated by the site survey tool. The site survey tool may also transmit all of the inputted data to a database located at the control center to keep an archive of all of the information collected at all of the remote facilities.

As represented by block 2022, the local monitoring and control system 200 is built specifically for the facility based on the facilities site survey. To streamline this process, prior to installation, the installation team is provided various information about the facility and operations thereof so that the install team can immediately go directly to the install site and install the system, all information needed for the install team having been provided prior to arriving at the install site. Such information is provided upfront and may include starting job instructions, "what if" instructions, a copy of a "letter of introduction," safety policy, installation notes, how to attach the system to the facility, installation data sheets customize for the facility, hours of operation of the facility, location of keys and security codes, floor layouts, parking information, a copy of the material list, a copy of the wreckage near report, resolution procedures in the event an issue is presented, a contact list with phone numbers, a fax cover sheet with checklist of items to be included, and a copy of a point commissioning sheet.

Prior to installation, an e-mail notification is sent out to a manager of the facility some predetermined time before installation (e.g., two weeks) to alert the manager of the install of the local monitoring and control system 200. A list of the jobs to be completed is sent to security for the facility prior to the install so that security will have all security codes activated for the installers prior to the installers arriving at the facility. When the installers arrive at the facility, the installers let the control center know that they are starting the install. The installers provide the control center with the workers' names, the date the job started, and/or any other pertinent information. In one embodiment, this information is provided to both the control center and the facility manager and the control center stores the information in a database. The installer then performs a "meet and greet" with the building manager or other person in charge by presenting the manager with the Letter of Introduction. The installer then goes through a questionnaire with the manager and obtains any keys needed to access any specific areas for the install. The installer then calls security to confirm that the security code provided to the installer is activated for after-hours work. The installer calls the control center software technicians when installation at the facility has been completed and is ready for remote commissioning.

As represented by block 2020, a remote commissioning of the installation is performed from the control center. A quality control representative at the control center goes through a checklist to ensure that everything was installed properly at the facility. This process is performed remotely from the facility using software at the control center which communicates over a network with the local monitoring and control system 200 just installed at the facility. A successful commissioning of the install at the remote facility confirms to representatives at the control center that the install is complete and that remote monitoring and control of the facility may then commence.

After the install is complete, the installers turn in all of the paperwork for closing, which is reviewed for accuracy and completeness. These documents are then uploaded to an electronic database and received at the control center where they are saved in an appropriate job folder in the control center's memory. The control center then enters the date these documents are received and closes the project, indicating that the project has been completed. The control center then notifies the manager at the facility that the job has been completed and forwards any documents to the manager. All specifications of the local monitoring and control system 200 that was installed at the facility are then saved in the job folder and also forwarded to the manager of the facility.

FIG. 20 illustrates a block schematic diagram of an exemplary system for site survey in accordance with an embodiment of the invention. The system 2100 includes a site survey tool 2104, which as previously discussed, is a mobile handheld electronic device configured to collect and transmit data electronically from and to a computer. A module for site survey (hereinafter "site survey module") 2102 is operable on the site survey tool 2104, or similar device of a user 2106. In addition to the site survey module 2102 on the site survey tool 2104, the system 2100 further includes a server 2110 accessible by the site survey tool 2104 via a network 2112. The site survey tool 2104 communicates with the server 2110 wirelessly via an antenna 2105 or via any other electronic communication means over a network 2112. In one embodiment, the network 2112 is the Internet, a private network, a virtual private network, or other network. Each site survey tool 2104 is similar to the exemplary site survey tool 2104.

The previously-described method 2000 is embodied in or performed by the site survey module 2102 and/or modules 2111 and 2113 on the server 2110. For example, in one embodiment of the invention, the site survey tool 2104 executes blocks 2002-2020 of FIG. 1, while block 2024 of FIG. 1 is performed on the server 2110. Additionally, the site survey module 2102 communicates with the server 2110 via modules 2117 and 2113 to transmit data in a bi-communicative fashion.

The site survey module 2102 is a self-contained system with embedded logic, decision making, state-based operations and other functions that operate in conjunction with other software. The self-contained system allows the control center, survey team, installers, individuals, and/or the like to interact/communicate with each other.

The site survey module 2102 is stored on a file system 2116 or memory of the site survey tool 2104. The site survey module 2102 is accessed from the file system 2116 and run on a processor 2118 associated with the site survey tool 2104.

As illustrated in FIG. 20, various remote facilities 2114 can be surveyed by the site survey tool 2104. These facilities 2114 can be surveyed individually or all as a single project in the case of a bulk install process. As previously discussed, the facilities 2114 may be any building 2101, ATM (not shown), signage (not shown), or other asset of a bank or other organization that is remote (e.g., physically, geographically, and/or logically separate from) the control center 2106. The facilities 2114 consume energy that the control center 2106 desires to remotely monitor, manage, and/or control.

In some embodiments, the facilities 2114 include energy-consuming devices, such as an HVAC system 2107 and/or any other energy-consuming device 2109. The site survey tool 2104 connects with the HVAC system 2107 via any method, such as via the antenna 2105 (using, for example, but not limited to, a Bluetooth connection and communication protocol), via a cable 2115 that plugs into a port 2116 on the site survey tool 2104, or any other communication method. Once the site survey tool 2104 is electrically or otherwise communicably connected to the HVAC system 2107 or any other device 2109, the site survey tool 2104 automatically recognizes the HVAC system 2107 or other device 2109 and automatically gathers data from the HVAC system 2107 or other device 2109. This process is controlled by the module 2122 of the site survey module 2102.

As illustrated in FIG. 20, in one embodiment of the invention, the site survey tool 2104 includes a display 2130 and a speaker 2132 or speaker system. The display 2130 presents various inquiries as described herein (e.g., the inquiries illustrated in FIG. 21) and permits input of data. Any graphical user interfaces (GUIs) 2140 associated with the site survey module 2102 and avatar attributes is also be presented on the display 2130. The speaker 2132 may present any voice or other auditory signals or information to the user 2106.

The site survey tool 2104 also includes one or more input devices, output devices or combination input and output device, collectively I/O devices 2134. The I/O devices 2134 may include a keyboard, computer pointing device or similar mechanisms to input data, as described herein, and/or to control/navigate the GUIs 2140. The I/O devices 2134 may also include disk drives or devices for reading computer media including computer-executable program instructions.

The site survey module 2102 includes a module to input data 2120. The module to input data 2120 allows the user to input various information regarding the survey and responses to inquiries into the site survey tool 2104. The module to input data 2120 is accessed or activated whenever the user desires to input information, and the module 2120 can call other modules such as the module to transmit data 2117 and/or GUIs 2140 as described hereinbelow.

The site survey module 2102 also includes GUIs 2140. The site survey module 2102 presents one or more predetermined GUIs 2140 to permit the user to input data during the survey. The GUIs 2140 also permit the user to establish or change any program options, program defaults, and/or any other settings. The GUIs 2140 are predetermined and/or presented in response to the user indicating that the user would like to enter information and/or settings. The GUIs 2140 are generated by the site survey module 2102 and presented on the display 2130 of the site survey tool 2104. The GUIs 2140 also include GUIs that permit a user to manage the site survey tool 2104 and to control transmission of data to the server 2110, as well as any other functions or features associated with gathering data for a site survey.

The server 2110 includes various modules for receiving data from the site survey tool 2104 and completing certain portions of the installation process described in FIG. 19. For example, the server 2110 includes a module for receiving survey data 2113, which allows the site survey tool 2104 to connect and transmit data to the server 2110. By way of another example, the server 2110 also includes a module for remote commissioning 2111 to perform remote commissioning after the installation is completed, as previously discussed with regard to block 2024 of FIG. 19. The server 2110 resides at or is associated with the control center 2106 (e.g., the IC3 4) such that the control center 2106 as direct access thereto. Other modules located on the server 2110 are not illustrated in FIG. 20, but perform various aspects consistent with the scope of the present invention such as simultaneous and remote monitoring and managing of energy of the remote locations 2114 from the control center 2106.

As will be appreciated by one of skill in the art, the present invention, as described hereinabove and in FIGS. 1-21R, may be embodied as a method (e.g., a computer-implemented process, a business process, or any other process), apparatus (including a device, machine, system, computer program product, and/or any other apparatus), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable computer readable medium may be utilized. The computer readable medium may be, for example but not limited to, an electronic, magnetic, optical, electromagnetic, infrared, or semiconductor system, apparatus, device, or medium. More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code. The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

The following U.S. patent applications are filed concurrently with the present application and are hereby incorporated by reference: U.S. patent application Ser. No. 12/617,217 to Johnson et al. and entitled "Facility Maintenance and Management System"; U.S. patent application Ser. No. 12/617,224 to Johnson et al. and entitled "Site Survey and Installation for Remote Facility Management System"; U.S. patent application Ser. No. 12/617,228 to Johnson et al. and entitled "Facility Monitoring and Control System Interface"; and U.S. patent application Ser. No. 12/621,265 to Johnson et al. and entitled "Weather-Related Energy Usage Analysis."

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible. Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously. Those skilled in the art will also appreciate, in view of this disclosure, that different embodiments of the invention described herein may be combined to form other embodiments of the invention.

What is claimed is:

1. A method of remotely managing a plurality of energy-using devices, the method comprising:

installing a device energy sensor at each of the plurality of energy-using devices located at a plurality of facilities, wherein the plurality of facilities comprise a plurality of buildings of a first type and a plurality of buildings of a second type, wherein the plurality of buildings of the first type is different than the plurality of buildings of the second type, wherein each device energy sensor is configured to measure an electrical characteristic indicative of energy being used by each of the plurality of energy-using devices located at the plurality of buildings of the first and second type, wherein each device energy sensor includes a communication interface configured to communicate an energy-indicative measurement over a network;

using a command and control center, located geographically remote from the plurality of buildings of the first type and the plurality of buildings of the second type, to centrally manage and monitor the plurality of energy-using devices located at the plurality of buildings of the first type and the second type, wherein the command and control center comprises a user interface, a communication interface, a processing device, and a memory device, and wherein using the command and control center to centrally manage and monitor comprises:
receiving, via the network, at the central command and control center the energy-indicative measurements from each of the device energy sensors at each of the plurality of energy-using devices located at the plurality of buildings of the first type and the plurality of buildings of the second type;
monitoring, using the energy-indicative measurements, each of the plurality of energy-using devices located at the plurality of buildings of the first type and the second type; and
managing, using a plurality of control panels, the plurality of energy-using devices located at the plurality of buildings of the first type and the plurality of buildings of the second type, wherein each of the plurality of buildings of the first type and each of the plurality of buildings of the second type include, at least, two or more of the plurality of energy-using devices and, at least, one of the plurality of control panels.

2. The method of claim 1, further comprising:
installing a controller at each of the plurality of energy-using devices, the controller comprising a communication interface configured to receive commands over the network and adjust operation of the energy-using devices based on the commands; and
using the central command and control center to located geographically remote from the plurality of facilities to issue commands, via the network, to the controller at each of the plurality of energy-using devices in order to control operation of the plurality of energy-using devices.

3. The method of claim 1, wherein the plurality of energy-using devices comprises HVAC (heating, ventilating, or air conditioning) devices.

4. The method of claim 1, wherein the electrical characteristic indicative of the energy being used by the energy-using device comprises electrical current.

5. The method of claim 4, wherein the plurality of energy-using devices located at the plurality of facilities comprises one or more lighting zones.

6. The method of claim 1, further comprising:
using the central command and control center located geographically remote from the plurality of facilities to issue an alarm automatically whenever the received energy-indicative measurements satisfy one or more alarm conditions stored in a memory device operatively coupled to the remote computer.

7. The method of claim 1, further comprising:
installing a facility energy sensor at each of the plurality of facilities, the facility energy sensor configured to measure an electrical characteristic indicative of energy being used by one of the plurality of facilities, wherein each facility energy sensor includes a communication interface configured to communicate an energy-indicative measurement over the network; and
using the central command and control center located geographically remote to the plurality of facilities to receive the energy-indicative measurements from the facility energy sensor located at each of the plurality of facilities, and to compare the energy-indicative measurements received from the device energy sensors located at one of the plurality of facilities with the facility energy sensor located at the one of the plurality of facilities.

8. A heating or cooling system comprising:
a plurality of current sensors, each of the plurality of current sensors measuring electrical current drawn by one of a plurality of heating or cooling devices, wherein each of the plurality of current sensors comprises a communication interface for communicating measurements of electrical current over a network;
a plurality of control panels comprising a communication interface and configured to use the communication interface to gather, via the network, the measurements of electrical current from each of the plurality of current sensors;
a plurality of facilities, wherein the plurality of facilities comprise a first plurality of buildings and a second plurality of buildings, wherein the first plurality of buildings is different than the second plurality of buildings, each of the first and the second plurality of buildings comprising one or more of the plurality of heating or cooling devices and at least one of the plurality of control panels; and
a command and control center located geographically remote from the first and second plurality of buildings, wherein the command and control center is used to centrally manage and monitor the plurality of heating or cooling devices located the first and the second plurality of buildings, wherein the command and control center comprises a user interface, a communication interface, a processing device, and a memory device, and wherein using the command and control center to centrally manage and monitor comprises:
receiving, via the network, at the central command and control center the measurements of electrical current from each of the plurality of current sensors at each of the heating or cooling devices located at the first plurality of buildings and the second plurality of buildings;
monitoring, using the measurements of electrical current, each of the plurality of heating or cooling devices located at the first and the second plurality of buildings; and
managing, using a plurality of control panels, the plurality of heating or cooling devices located at the first plurality of buildings and the second plurality of buildings, wherein each of the first plurality of buildings and each of the second plurality of buildings include, at least, two or more of the plurality of heating or cooling devices and, at least, one of the plurality of control panels.

9. The heating or cooling system of claim 8, further comprising:
a plurality of controllers, each of the plurality of controllers configured to control at least a portion of one of the plurality of heating or cooling devices.

10. The heating or cooling system of claim 8, wherein the network comprises a local area network, wherein the control panel further comprises a second communication interface configured to communicate, via a second network, with the command and control center located geographically remote from the plurality of facilities, and wherein the second network comprises a wide area network.

11. The heating or cooling system of claim 8, further comprising:
a facility energy sensor configured to measure an electrical characteristic indicative of energy being used by a facility at which at least one of the plurality of heating or cooling devices is located, wherein each facility energy sensor includes a communication interface configured to communicate an energy-indicative measurement over the network.

12. The heating or cooling system of claim 11, further comprising:
a computer configured to receive the energy-indicative measurements from the facility energy sensor, and to compare the energy-indicative measurements received from the facility energy sensor to energy-indicative measurements received from the current sensors associated with the heating or cooling devices located at the facility at which the facility energy sensor is located.

13. The heating or cooling system of claim 8, further comprising:
a plurality of temperature sensors, each of the plurality of temperature sensors measuring temperature of a space heated or cooled by one of the plurality of heating or cooling devices, wherein each of the plurality of temperature sensors comprises a communication interface for communicating temperature measurements over a network, and wherein the control panel is configured to use the communication interface to gather, via the network, the temperature measurements from each of the plurality of temperature sensors.

14. The heating or cooling system of claim 13, further comprising:
a plurality of controllers, each of the plurality of controllers configured to control one of the plurality of heating or cooling devices, wherein each of the plurality of controllers comprises a communication interface for communicating with the control panel over the network, wherein the system is configured to generate a command based on a temperature measurement from at least one of the plurality of temperature sensors, wherein the control panel is configured to communicate the command to at least one of the plurality of controllers, and wherein the at least one of the plurality of controllers is configured to control the heating or cooling system based on the command.

15. The heating or cooling system of claim 8, further comprising:
a plurality of temperature sensors, each of the plurality of temperature sensors measuring temperature of a fluid entering one of the plurality of heating or cooling devices, wherein each of the plurality of temperature sensors comprises a communication interface for communicating temperature measurements over a network, and wherein the control panel is configured to use the communication interface to gather, via the network, the temperature measurements from each of the plurality of temperature sensors.

16. The heating or cooling system of claim 8, further comprising:
a plurality of humidity sensors, each of the plurality of humidity sensors measuring humidity of a space heated or cooled by one of the plurality of heating or cooling devices, wherein each of the plurality of humidity sensors comprises a communication interface for communicating humidity measurements over a network, and wherein the control panel is configured to use the communication interface to gather, via the network, the humidity measurements from each of the plurality of humidity sensors.

17. The heating or cooling system of claim 16, further comprising:
a plurality of controllers, each of the plurality of controllers configured to control one of the plurality of heating or cooling devices, wherein each of the plurality of controllers comprises a communication interface for communicating with the control panel over the network, wherein the system is configured to generate a command based on a humidity measurement from at least one of the plurality of humidity sensors, wherein the control panel is configured to communicate the command to at least one of the plurality of controllers, and wherein the at least one of the plurality of controllers is configured to control the heating or cooling system based on the command.

18. The heating or cooling system of claim 8, further comprising:
a plurality of carbon dioxide sensors, each of the plurality of carbon dioxide sensors measuring carbon dioxide in a space heated or cooled by one of the plurality of heating or cooling devices, wherein each of the plurality of carbon dioxide sensors comprises a communication interface for communicating carbon dioxide measurements over a network, and wherein the control panel is configured to use the communication interface to gather, via the network, the carbon dioxide measurements from each of the plurality of carbon dioxide sensors.

19. The heating or cooling system of claim 18, further comprising:
a plurality of controllers, each of the plurality of controllers configured to control one of a plurality of ventilating devices, wherein each of the plurality of controllers comprises a communication interface for communicating with the control panel over the network, wherein the system is configured to generate a command based on a carbon dioxide measurement from at least one of the plurality of carbon dioxide sensors, wherein the control panel is configured to communicate the command to at least one of the plurality of controllers, and wherein the at least one of the plurality of controllers is configured to control the one of the plurality of ventilating devices based on the command.

20. A method of remotely managing energy-using devices, the method comprising:
installing a device energy sensor at each of a first plurality of energy-using devices and a second plurality of energy-using devices, the device energy sensor being configured to measure an electrical characteristic indicative of energy being used by each of first and second the energy-using devices, wherein each device energy sensor includes a communication interface configured to communicate an energy-indicative measurement over a network;
using a command and control center, located geographically remote from a first plurality of buildings and a second plurality of buildings, to centrally manage and monitor the first and the second plurality of energy-using devices located at the first plurality and second plurality of buildings, wherein the command and control center comprises, at least, a user interface, a communication interface, a processing device, and a memory device, and wherein using the command and control center to centrally manage and monitor comprises:
receiving, via the network, at the command and control center, the energy-indicative measurements from the device energy sensors at each of the first plurality and second plurality of energy-using devices;
monitoring, via the user interface of the command and control center and using the energy-indicative measurements, each of the first plurality and second plurality of energy-using devices;
managing, using a first plurality of control panels, the first plurality of energy-using devices located at the first plurality of buildings, wherein each of the first plurality of buildings includes, at least, two or more of the first plurality of energy-using devices and, at least, one of the first plurality of control panels; and managing, using a second plurality of control panels, the second plurality of energy-using devices located at the second plurality buildings, wherein each of the second plurality of buildings includes, at least, two or more of the second plurality of energy-using devices and, at least, one of the second plurality of control panels, and wherein the second plurality of buildings is different than the first plurality of buildings, and wherein the first plurality of buildings and the second plurality of buildings are maintained by one institution.

21. The method of claim 1, wherein the plurality of buildings of the first type are free-standing buildings, and wherein the plurality of buildings of the second type are attached buildings.

* * * * *